US008329784B2

(12) United States Patent
Quintens et al.

(10) Patent No.: US 8,329,784 B2
(45) Date of Patent: *Dec. 11, 2012

(54) PROCESS FOR PREPARING A WHITE NON-TRANSPARENT MICROVOIDED BIAXIALLY STRETCHED FILM

(75) Inventors: Dirk Quintens, Westerlo (BE); Luc Leenders, Herentals (BE)

(73) Assignee: Agfa-Gevaert N.V., Mortsel (BE)

( * ) Notice: Subject to any disclaimer, the term of this patent is extended or adjusted under 35 U.S.C. 154(b) by 3 days.

This patent is subject to a terminal disclaimer.

(21) Appl. No.: 13/018,207

(22) Filed: Jan. 31, 2011

(65) Prior Publication Data

US 2011/0133359 A1      Jun. 9, 2011

Related U.S. Application Data

(62) Division of application No. 11/866,143, filed on Oct. 2, 2007, now abandoned.

(60) Provisional application No. 60/850,512, filed on Oct. 10, 2006, provisional application No. 60/850,511, filed on Oct. 10, 2006, provisional application No. 60/908,526, filed on Mar. 28, 2007, provisional application No. 60/908,536, filed on Mar. 28, 2007, provisional application No. 60/908,542, filed on Mar. 28, 2007, provisional application No. 60/908,545, filed on Mar. 28, 2007.

(30) Foreign Application Priority Data

| Oct. 3, 2006 | (EP) | 06121665 |
|---|---|---|
| Oct. 3, 2006 | (EP) | 06121669 |
| Mar. 27, 2007 | (EP) | 07104947 |
| Mar. 27, 2007 | (EP) | 07104948 |
| Mar. 27, 2007 | (EP) | 07104950 |
| Mar. 27, 2007 | (EP) | 07104953 |

(51) Int. Cl.
| C08L 67/02 | (2006.01) |
| C08J 9/32 | (2006.01) |
| B29C 49/08 | (2006.01) |
| B32B 3/26 | (2006.01) |
| B32B 27/36 | (2006.01) |
| G03C 1/76 | (2006.01) |

(52) U.S. Cl. ........ 523/500; 523/218; 523/319; 523/501; 525/165; 525/177; 264/210.7; 428/304.4; 428/315.5; 428/319.7; 430/533; 430/534

(58) Field of Classification Search ................. 523/500, 523/218, 319, 501; 525/165, 177; 264/210.7; 428/304.4, 315.5, 319.7; 430/533, 534
See application file for complete search history.

(56) References Cited

U.S. PATENT DOCUMENTS

| 3,755,499 A | 8/1973 | Heijo et al. |
|---|---|---|
| 4,128,689 A | 12/1978 | Heaps et al. |
| 4,174,883 A | 11/1979 | Imataki et al. |
| 4,243,769 A | 1/1981 | Pritchett |
| 4,342,846 A | 8/1982 | Silberberg |
| 5,457,018 A | 10/1995 | Sommer et al. |
| 6,703,193 B1 | 3/2004 | Laney et al. |
| 7,498,125 B2 | 3/2009 | Quintens |
| 8,034,541 B2 * | 10/2011 | Quintens .................. 430/311 |
| 2004/0167022 A1 | 8/2004 | Laney et al. |

FOREIGN PATENT DOCUMENTS

| EP | 0 436 178 A2 | 7/1991 |
|---|---|---|
| EP | 0 654 503 A2 | 11/1993 |
| JP | 09 255 806 A | 9/1997 |
| JP | 2004-196951 A | 7/2004 |

OTHER PUBLICATIONS

European Search Report issued in European Patent Application No. 06 121 665.1, mailed Mar. 21, 2007.

* cited by examiner

*Primary Examiner* — Michael Pepitone
(74) *Attorney, Agent, or Firm* — Leydog, Voit & Mayer, Ltd.

(57) ABSTRACT

Disclosed is a process for preparing a non-transparent microvoided axially stretched film including i) mixing a linear polyester having monomer components consisting essentially of an aromatic dicarboxylic acid, an aliphatic diol and optionally an aliphatic dicarboxylic acid, a non-crosslinked random SAN-polymer and one or more additional ingredients to produce a mixture, ii) forming the mixture produced in step i) in a thick film followed by quenching; iii) stretching the thick film at a temperature between the glass transition temperature of the SAN-polymer and the glass transition temperature of said linear polyester to at least twice the initial length, and (iv) further stretching the film at an angle substantially 90° to the previous stretching process to at least twice the initial length and at 90° C. or below.

11 Claims, No Drawings

PROCESS FOR PREPARING A WHITE NON-TRANSPARENT MICROVOIDED BIAXIALLY STRETCHED FILM

CROSS-REFERENCE TO RELATED PATENT APPLICATIONS

This application is a divisional of U.S. application Ser. No. 11/866,143, filed Oct. 2, 2007, subsequently abandoned, which claims the benefit of U.S. Provisional Application No. 60/850,512 filed Oct. 10, 2006, U.S. Provisional Application No. 60/850,511 filed Oct. 10, 2006, U.S. Provisional Application No. 60/908,526 filed Mar. 28, 2007, U.S. Provisional Application No. 60/908,536 filed Mar. 28, 2007, U.S. Provisional Application No. 60/908,542 filed Mar. 28, 2007, U.S. Provisional Application No. 60/908,545 filed Mar. 28, 2007, European Application No. 06121669.3 filed Oct. 3, 2006, European Application No. 06121665.1 filed Oct. 3, 2006, European Application No. 07104953.0 filed Mar. 27, 2007, European Application No. 07104947.2 filed Mar. 27, 2007, European Application No. 07104948.0 filed Mar. 27, 2007, and European Application No. 07104950.6 filed Mar. 27, 2007, all of which are incorporated by reference.

FIELD OF THE INVENTION

The present invention concerns non-transparent microvoided axially stretched films, a production process therefor.

BACKGROUND OF THE INVENTION

U.S. Pat. No. 3,755,499 discloses a synthetic sheet for writing purposes which consists essentially of a linear polyester selected from the group consisting of polyethylene terephthalate, polyethylene isophthalate, and copolymers of ethylene terephthalate and ethylene isophthalate, and a high polymer having a higher glass transition point than that of said linear polyester at a mixing ration of from 7 to 35% by weight of the latter with respect to the polymer mixture, which high polymer is selected from the group consisting of a polymethylmethacrylate, a copolymer of acrylonitrile an styrene, a copolymer of acrylonitrile, butadiene and styrene, said synthetic sheet having a very finely coarsened surface due to said high polymer which is uniformly dispersed in said linear polyester to constitute the nuclei for the irregular surface thereof. Both simultaneous and sequential stretching of these mixed polymer materials are disclosed usually at 85 to 95° C. with stretching ratios from 2 to 3.5 times the original length, the sheet being adjusted for writability and opacity in conformity with its eventual use. The object of the invention of U.S. Pat. No. 3,755,499 is stated to be the provision of a synthetic sheet for writing and similar other purposes having improved surface condition, opacity, and other requisite properties. U.S. Pat. No. 3,755,499 further discloses that the thermoplastic resin to be mixed may or may not have compatibility with the linear polyester, provided that it can be substantially uniformly mixed with and dispersed in the linear polyester at the time of forming, that the formed film, regardless of whether it is transparent or not, may produce a uniform mat surface upon being stretched and the film thus obtained is heat-shrinkable, acceptable in its writing properties, and possesses adequate opacity and that in order to further improve stability in the film size at a high temperature, it may be heat-treated at a temperature above the stretching temperature of the linear polyester and below the melting point of both mixing thermoplastic resin and the linear polyester. EXAMPLE 2 exemplifies the mixing of a copolymer of acrylonitrile and styrene having a glass transition temperature of 100 to 105° C. with polyethylene terephthalate in concentrations of 7 and 35% by weight and the forming of 150 μm thick film samples by melt-extrusion through a T-die. These film sheets were then stretched simultaneously by a biaxial stretching machine at a stretch ratio twice as large as the original length of the film in the longitudinal as well as transverse directions thereof at 85° C. and also stretched simultaneously biaxially three times longitudinally and three times transversely at 85° C. The resulting films were reported to have the following properties:

| acrylonitrile-styrene copolymer (% by wt.) | 7 | 7 | 35 | 35 |
|---|---|---|---|---|
| Polyethylene terephthalate (% by wt.) | 93 | 93 | 65 | 65 |
| stretch ratio (L × W) times | 2 × 2 | 3 × 3 | 2 × 2 | 3 × 3 |
| thickness after stretching (μm) | 48 | 26 | 45 | 25 |
| rupture strength (kg/cm) | 880 | 1210 | 650 | 730 |
| elongation at Breaking Point(%) | 110 | 45 | 55 | 23 |
| light Transmission Factor (%) | 80.8 | 84.2 | 72.3 | 77.6 |
| haze value(%) | 92.5 | 90.6 | 94.3 | 96.6 |
| writability [pencil hardness] | ≦4H | ≦3H | ≦4H | ≦3H |

U.S. Pat. No. 3,755,499 fails to disclose the influence of addition of an inorganic opacifying pigment or of the imagewise heating on the opaque microvoided films disclosed therein.

U.S. Pat. No. 4,174,883 discloses a rear projection screen which comprises a light scattering member composed of a melted mixture consisting essentially of a dispersion medium polymer and a dispersed phase polymer dispersed therein, said melted mixture being obtained by melting and then mixing said polymers, wherein the absolute value of the difference between the refractive index of the dispersion medium polymer and the maximum refractive index of the dispersed phase polymer is from 0.01 to 0.25, and wherein the dispersion medium polymer is a member selected from high density polyethylene, low density polyethylene, polypropylene, 6,6-nylon, polyethylene terephthalate and polystyrene and the dispersed phase polymer is at least one member selected from the group consisting of high density polyethylene, low density polyethylene, polypropylene, polyethylene terephthalate, 6-nylon, 6,6-nylon, 6,10-nylon, polymethyl methacrylate, polymethyl acrylate, polyvinyl chloride resins, polyvinyl acetate resins, polyacetal resins, polystyrene, polycarbonates, nitrile rubber, neoprene rubber, chloroprene rubber, styrene-butadiene rubber, ethylene-vinyl acetate copolymers, and styrene acrylonitrile copolymers.

U.S. Pat. No. 4,128,689 discloses a process for preparing thermoplastic sheets or webs, which process comprises the steps of: (i) extruding a foamable thermoplastic polymer mixture through the die of a screw extruder to produce a foamed extrudate in sheet or web form, the foamable thermoplastic polymer mixture containing at least a first and a second thermoplastic polymer, the first thermoplastic polymer being substantially crystalline and having a higher melting point than, and being substantially immiscible with, the second thermoplastic polymer, and the temperature of extrusion being equal to or greater than the melting point of the first thermoplastic polymer; (ii) stretching the foamed extrudate from step (i) in the direction of extrusion as it leaves the die to rupture most of the cells of the foamed extrudate and to elongate the walls of the collapsed cells in the direction of stretch; (iii) compressing the stretched extrudate from step (ii) while it remains plastic; and (iv) cooling and foamed, stretched and compressed extrudate from step (iii). Furthermore, U.S. Pat. No. 4,128,689 discloses that the first thermoplastic polymer is preferably selected from high density polyethylene, polypropylene, polybutene-1, poly 4-methylpentene-1, polyethylene terephthalate, nylon 6, nylon 66 and nylon 11 and the second thermoplastic polymer is preferably a non-crystalline thermoplastic polymer preferably selected from cellulose acetate, cellulose propionate, cellulose acetate butyrate, ethyl cellulose, polystyrene, styrene-acrylonitrile copolymers, polycarbonates, styrene and methyl styrene copolymers and phenylene oxide polymers.

U.S. Pat. No. 4,243,769 discloses a method for providing a grossly homogeneous, permanently miscible mixture of polymers which has properties not evident in a simple blend of the polymers and which does not separate spontaneously into the component polymers, which comprises uniformly mixing (a) a polymer component containing a nitrile functionality with (b) a polymer component containing hydroxyl or esterified hydroxyl functional groups condensable with nitriles, said polymer components (a) and (b) tending to spontaneously separate from a simple blend thereof, in the presence of from about 0.001 to 8 percent by weight of the mixture of polymers and acid of an acid compatibilizing agent and for a period sufficient to provide the aforesaid permanently miscible mixture of polymers which, at ambient temperature, is in the form of a solid. Furthermore, U.S. Pat. No. 4,243,769 discloses that the nitrile group material is preferably selected from the group consisting of polyacrylonitrile, polymethacrylonitrile, methacrylonitrile-acrylonitrile-vinyl acetate terpolymer, styrene-acrylonitrile copolymer, acrylonitrile-acrylic ester copolymer, acrylonitrile-butadiene-styrene terpolymer, acrylonitrile-styrene-alpha methyl styrene terpolymer, nitrile rubber, polycaprolactam-acrylonitrile graft copolymer, polyethylene-acrylonitrile graft copolymer, polyethylene terephthalate-acrylonitrile graft copolymer, cyano-styrene-methylmethacrylate copolymer, acrylonitrile-methyl vinyl ether copolymer, methacrylonitrile-alpha methylstyrene copolymer, cyanoethylated cellulose, cyanoethylated polyvinyl alcohol, cyanoethylated polyamide, cyanoethylated polystyrene and cyano-ethylated silicone polymer; and the chemically condensable material is preferably selected from the group consisting of polyvinyl alcohol, polyvinyl butyral containing unreacted alcohol groups, ethylene-vinyl acetate, saponified or partly saponified ethylene-vinyl acetate copolymers, ethylene-vinyl acetate-sulfur dioxide terpolymer, vinyl chloride-vinyl acetate, nylon grafted with vinyl acetate, polytetrafluoroethylene grafted with vinyl acetate, polyvinyl alcohol grafted with butylmethacrylate, vinyl acetate-isobutyl vinyl ether copolymer, styrene-allyl alcohol copolymer polyethylene adipate, styrenated polyester of maleic and phthalic acids with ethylene and propylene glycols, poly(ethylene terephthalate), cellulose, hydroxyethyl methacrylate copolymer, hydroxybutyl vinyl ether copolymer, hydroxyethyl methacrylamide copolymer, polyethylene glycol, hydroxyl terminated polystyrene, hydroxyl terminated polybutadiene, and hydroxyl terminated polyisoprene.

U.S. Pat. No. 4,342,846 discloses a blend comprising: (1) a polyester resin formed by reaction of a dicarboxylic acid and a diol, preferably poly(ethylene terephthalate); and (2) an impact resistant interpolymer comprising crosslinked (meth)acrylate, crosslinked styrene-acrylonitrile, and uncrosslinked styrene-acrylonitrile polymeric components.

EP 0 436 178A2 discloses a polymeric shaped article characterized in that said article is comprised of a continuous oriented polymer matrix having dispersed therein microbeads of a cross-linked polymer which are at least partially bordered by void space, said microbeads being present in an amount of 5-50% by weight based on the weight of said oriented polymer, said void space occupying 2-60% by volume of said article. EP 0 436 178A2 further discloses that said cross-linked polymer preferably comprises polymerizable organic material which is a member selected from the group consisting of an alkenyl aromatic compound having the general formula Ar—C(—R)=CH$_2$ wherein Ar represents an aromatic hydrocarbon radical, or an aromatic halohydrocarbon radical of the benzene series and R is hydrogen or the methyl radical; acrylate-type monomers including monomers of the formula CH$_2$=C(—R')—C(—OR)=O wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula CH$_2$=CH—O—C(—R)=O wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH, wherein n is a whole number within the range of 2-10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

EP-A 0 654 503 (which corresponds to U.S. Pat. No. 5,457,018) discloses a shaped article prepared from a polymer blend of 50 to 97 wt. % of a linear polyester and 3 to 50 wt. % of a polymer containing styrene e.g. a graft polymer of acrylonitrile, butadiene and styrene (ABS), a styrene-acrylonitrile copolymer or a high impact polystyrene (HIPS), wherein the percentages relate to the sum of the polyester and the polymer containing styrene. EP-A 0 654 503 further discloses that a preferred polyester contains at least 80 wt. % polyethylene terephthalate and may contain up to 20 wt. % polyethylene isophthalate and the support material according to the invention may contain further additives, for example pigments, in particular TiO$_2$, BaSO$_4$, CaCO$_3$, optical whiteners or blue dyes, which further increase covering power and improve sharpness, in particular 0.5 to 10 wt. %, related to the total weight of the constituent used, preferably 2 to 10, preferably 3.5 to 6.5 wt. % of TiO$_2$ pigment, preferably of the anatase type, are added. Example 3 discloses the blending of 15 wt % related to the whole weight of constituents used, of a copolymer prepared from 72 wt % of styrene and 28 wt % acrylonitrile with an M$_w$ of approximately 115,000 and M$_w$/M$_n$≦3 then drying at 75° C. followed by melting in a PET extruder, extrusion through a slot, longitudinal stretching, application of a subbing layer, transverse stretching and heat-setting for 1 minute at 160° C. No further ingredients are disclosed.

JP 09-255806A discloses a void-containing polyester film suitable for use in recording paper containing a number of minute voids produced by mixing a polyester with a thermoplastic resin incompatible with the polyester and orienting the obtained polymer mixture in at least one direction with the thermoplastic resin incompatible with the polyester being present in the film in the form of particles having a major axis diameter of 1-50 μm, a thickness of ≦10 μm and a major axis/thickness ratio of 2-100. JP 09-255806A further discloses that the thermoplastic resin incompatible with the polyester may be polyethylene, polypropylene, polymethyl pentene and such polyolefin type resins, ionomer resin EP rubber and such copolymer polyolefin resins, polystyrene, styrene-acrylonitrile copolymers, styrene-butadiene-acrylonitrile copolymers and such polystyrene type resins, polyacrylate resins, polycarbonate resins or polyacrylonitrile type resins. JP 09-255806A exemplifies opaque and translucent biaxially stretched poly(ethylene terephthalate) using polystyrene or poly(methylpentene) as the incompatible thermoplastic resin and pigmentation with titanium dioxide.

JP 2004-196951A discloses a polyester film, which is a film consisting of 78 to 55 weight % of a polyester (1) with butylene terephthalate repeating units as main component and 22 to 45 weight % of acrylonitrile-styrene copolymer (2), having as distinctive feature that the acrylonitrile-styrene copolymer (2) is dispersed in particle shape inside the polyester (1), the average particle length in major axis direction of those dispersed particles is 3 to 50 μm, the average particle length in minor axis direction is less than 5 μm, the average aspect ratio is 2.0 or more, the film's tear strength in the direction orthogonal to the major axis direction of the dispersed particles (T(⊥)) and the tear strength in the major axis direction (T(s)) are in a relation of T(⊥)/T(s)>1.0, and it has easy tear property in the direction orthogonal to the major axis direction of the dispersed particles. The concentration of acrylonitrile in the styrene-acrylonitrile polymer.

U.S. Pat. No. 6,703,193 discloses an image recording element comprising a microvoided layer comprising a continuous phase polyester matrix having dispersed therein crosslinked organic microbeads and non-crosslinked polymer particles that are immiscible with the polyester matrix of said microvoided layer. U.S. Pat. No. 6,703,193 further discloses that if only non-crosslinked polymer particles that are immiscible with the polyester matrix are used in the microvoided layer of a silver halide display media the raw material and manufacturing cost is low, as a compounding step is not required, but the image sharpness is very poor due to the relatively large voids that result. Thus although the use of immiscible polymer particles as voiding agents in imaging media is attractive from a cost standpoint, the quality with respect to sharpness is prohibitively inferior. U.S. Pat. No. 6,703,193 also discloses that it has been unexpectedly discovered that by mixing both the crosslinked organic microbeads and the non-crosslinked polymer particles that are immiscible with polyester into the polyester matrix of the microvoided layer the deficiencies of the void initiators when used singularly are synergistically overcome, especially with respect to image quality and manufacturability. The combination of crosslinked organic beads and non-crosslinked polymer particles immiscible in a polyester matrix enjoys the quality, with respect to sharpness of microbead-voided media, without the expected degradation associated with the addition of a material with poor sharpness quality, with significant cost reductions and manufacturing time and effort reductions resulting from the need to use less costly raw material which in turn lowers the time and effort needed to compound microbeads with matrix polymer. U.S. Pat. No. 6,703,193 also discloses that the voided layer may contain white pigments which are known to improve the photographic responses such as whiteness or sharpness such as titanium dioxide, barium sulfate, clay, calcium carbonate or silica; and that addenda may be added to the layers to change the color of the imaging element. U.S. Pat. No. 6,703,193 fails to disclose the influence of image-wise heating on the opaque microvoided films disclosed therein.

The prior art non-transparent microvoided axially stretched film has suffered from insufficient opacity together with a lack of dimensional stability or sufficient dimensional stability and insufficient opacity. Moreover, for particular applications the whiteness of the non-transparent microvoided axially stretched film was insufficient.

ASPECTS OF THE INVENTION

It is therefore an aspect of the present invention to provide an improved non-transparent microvoided axially stretched film.

It is therefore a further aspect of the present invention to provide a process for producing an improved non-transparent microvoided axially stretched film.

It is therefore also an aspect of the present invention to provide a process for obtaining a transparent pattern in a non-transparent microvoided axially stretched film.

Further aspects and advantages of the invention will become apparent from the description hereinafter.

SUMMARY OF THE INVENTION

It has been surprisingly found that addition of small quantities of an opacifying inorganic pigment enables the thermal fixation (setting) process necessary to realize acceptable dimensional stability to be carried out at lower temperatures, which surprisingly results in a loss in opacity during thermal fixation, which is substantially lower than that occurring at the higher thermal fixation temperatures, which would otherwise be necessary. It has also been surprisingly found that opacity is promoted by using lower temperatures than conventionally used during stretching and in particular by using lower temperatures than conventionally used with polyethylene terephthalate-SAN-polymer blends during transversal stretching and by adjusting the polyester matrix composition to make this realizable.

Aspects of the present invention are realized by a film consisting essentially of a continuous phase linear polyester matrix having dispersed therein a non-crosslinked random SAN-polymer and dispersed or dissolved therein at least one ingredient from the group of ingredients consisting of inorganic opacifying pigments, whitening agents, colorants, UV-absorbers, light stabilizers, antioxidants and flame retardants, wherein the film is white, microvoided, non-transparent and axially stretched; the linear polyester matrix has monomer units consisting essentially of at least one aromatic dicarboxylate, at least one aliphatic dimethylene and optionally at least one aliphatic dicarboxylate; and the weight ratio of the linear polyester to the non-crosslinked SAN-polymer is in the range of 2.0:1 to 19.0:1, wherein one of said at least one aromatic dicarboxyate monomer units is isophthalate and said isophthalate is present in said polyester matrix in a concentration of 15 mole % or less of all the dicarboxylate monomer units in said linear polyester matrix.

Aspects of the present invention are also realized by the use of the above-described non-transparent microvoided axially stretched film as a synthetic paper.

Aspects of the present invention are also realized by an image recording element comprising the above-described non-transparent microvoided axially stretched film, wherein the image is a non-photographic image.

Aspects of the present invention are also realized by a process for preparing a non-transparent microvoided axially stretched film comprising the steps of: i) mixing at least one linear polyester having monomer components selected from the group consisting of at least one aromatic dicarboxylic acid, at least one aliphatic diol and optionally at least one aliphatic dicarboxylic acid, a non-crosslinked random SAN-polymer and at least one ingredient from the group of ingredients consisting of inorganic opacifying pigments, whitening agents, colorants, UV-absorbers, light stabilizers, antioxidants and flame retardants in a kneader or an extruder to produce a mixture comprising the non-crosslinked random SAN-polymer in a polyester matrix, ii) forming the mixture produced in step i) in a thick film followed by quenching; and iii) stretching said thick film at a stretching tension of >2.5 N/mm² at a temperature between the glass transition temperature of said SAN-polymer and the glass transition temperature of said linear polyester to at least twice the initial length, wherein the weight ratio of the polyester matrix to said non-crosslinked random SAN-polymer is in the range of 2.0:1 to 19.0:1 and wherein one of said at least one aromatic dicarboxyate monomer units is isophthalate and said isophthalate is present in said polyester matrix in a concentration of 15 mole % or less of all the dicarboxylate monomer units in said linear polyester matrix.

Aspects of the present invention are also realized by a process for obtaining a transparent pattern comprising the step of: image-wise application of heat optionally supplemented by the application of pressure to the above-described non-transparent microvoided axially stretched film.

Preferred embodiments of the present invention are disclosed in the detailed description of the invention.

DETAILED DESCRIPTION OF THE INVENTION

Definitions

The term voids or microvoids, as used in disclosing the present invention, means microcells, minute closed cells, cavities, bubbles or pores or cellulation, which, for example, can be formed in an oriented polymeric film during stretching as the result of a void-initiating particle initiated by particles that are immiscible with the polyester matrix. The voids or microvoids can be unfilled or filled with air or a vapour of some sort. Even if initially unfilled the voids or microvoids may over time become filled with air or a vapour of some sort.

The term "opaque", means a percentage opacity to visible light of greater than 90% as determined according to ASTM D589-97 or according to opacity test T425m-60 as published by TAPPI, 360 Lexington Avenue, New York, USA.

The term foam, as used in disclosing the present invention, means a substance that is formed by trapping many gas bubbles in a liquid or solid.

The term film, as used in disclosing the present invention, is an extruded sheet of a particular composition or a sheet consisting of a multiplicity of films with the same or different compositions produced by co-extrusion of liquids with the same or different compositions in contact with one another. The term film is also applied to axially and biaxially stretched films. The terms film and foil are used interchangeably in the present disclosure.

The term "non-photographic image", as used in disclosing the present invention, means a image which is not produced with a conventional silver halide gelatinous emulsion.

The term dicarboxylate monomer unit in a linear polyester, as used in disclosing the present invention, means a monomer unit derived either from a dicarboxylic acid or an ester thereof.

The term dimethylene aliphatic monomer unit in a linear polyester, as used in disclosing the present invention, means a monomer unit derived from a dimethylene aliphatic diol or an ether thereof, wherein the term aliphatic includes alicyclic.

The term linear polyester, as used in disclosing the present invention, means a polyester comprising hydrocarbon dimethylene and dicarboxylate monomer units.

The term linear aromatic polyester, as used in disclosing the present invention, means a polyester comprising aliphatic dimethylene and aromatic dicarboxylate monomer units.

The term inorganic opacifying pigment, as used in disclosing the present application, means a pigment capable of opacifying (i.e. rendering more opaque) which includes substantially white inorganic pigments having a refractive index of at least 1.4 and pigments, which as a dispersion in a polymer are capable upon stetching of causing opacity due to microvoiding.

The term whitening agent, as used in disclosing the present invention, means a white/colourless organic compound which exhibits a blue luminescence under the influence of ambient UV-light.

The term "support", as used in disclosing the present invention, means a "self-supporting material" so as to distinguish it from a "layer" which may be coated as a solution or dispersion, evaporated or sputtered on a support, but which itself is not self-supporting.

It also includes an optional conductive surface layer and any treatment necessary for, or layer applied to aid, adhesion.

The term overprintable, as used in disclosing the present invention, means capable of being overprinted by conventional impact and/or non-impact printing processes.

The term conventional printing processes, as used in disclosing the present invention, includes but is not restricted to ink-jet printing, intaglio printing, screen printing, flexographic printing, offset printing, stamp printing, gravure printing, dye transfer printing, thermal sublimation printing and thermal and laser-induced processes.

The term pattern, as used in disclosing the present invention, means a non-continuous layer which can be in any form of lines, squares, circles or any random configuration.

The term layer, as used in disclosing the present invention, means a (continuous) coating covering the whole area of the entity referred to e.g. a support.

The term "non-transparent film", as used in disclosing the present invention, means a film capable of providing sufficient contrast to a transparent image to make the image clearly perceptible. A non-transparent film can be an "opaque film", but need not necessarily be completely opaque in that there is no residual translucence i.e. no light penetration through the film. Optical density in transmission as measured with a MacBeth TR924 densitometer through a visible filter can provide a measure of the non-transparency of a film. ISO 2471 concerns the opacity of paper backing and is applicable when that property of a paper is involved that governs the extent to which one sheet visually obscures printed matter on underlying sheets of similar paper and defines opacity as "the ratio, expressed as a percentage, of the luminous reflectance factor of a single sheet of the paper with a black backing to the intrinsic luminous reflectance factor of the same sample with a white reflecting backing. 80 g/m² copy paper, for example, is white, non-transparent and has an optical density of 0.5 as measured with a MacBeth TR924 densitometer through a yellow filter according to ISO 5-2 and metallized films typically have an optical density ranging from 2.0 to 3.0.

The term transparent, as used in disclosing the present invention, means having the property of transmitting at least 50% of the incident visible light without diffusing it and preferably at least 70% of the incident visible light without diffusing it.

The term flexible, as used in disclosing the present invention, means capable of following the curvature of a curved object such as a drum e.g. without being damaged.

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the dispersion medium under the pertaining ambient conditions, hence having a solubility of less than 10 mg/L therein.

Non-Transparent Microvoided Axially Stretched Film

Aspects of the present invention are realized by a film consisting essentially of a continuous phase linear polyester matrix having dispersed therein a non-crosslinked random SAN-polymer and dispersed or dissolved therein at least one ingredient from the group of ingredients consisting of inorganic opacifying pigments, whitening agents, colorants, UV-absorbers, light stabilizers, antioxidants and flame retardants, wherein the film is microvoided, non-transparent and axially stretched; the linear polyester matrix has monomer units consisting essentially of at least one aromatic dicarboxylate, at least one aliphatic dimethylene and optionally at least one aliphatic dicarboxylate; and the weight ratio of the linear polyester to the non-crosslinked SAN-polymer is in the range of 2.0:1 to 19.0:1, wherein one of said at least one aromatic dicarboxyate monomer units is isophthalate and said isophthalate is present in said polyester matrix in a concentration of 15 mole % or less of all the dicarboxylate monomer units in said linear polyester matrix.

According to a first embodiment of the non-transparent microvoided axially stretched self-supporting film, according to the present invention, the non-transparent film is a white film.

According to a second embodiment of the non-transparent microvoided axially stretched self-supporting film, according to the present invention, the non-transparent film is a coloured film.

According to a third embodiment of the non-transparent microvoided axially stretched self-supporting film, according to the present invention, at least one aliphatic dicarboxylate is present in the polyester matrix in a concentration of less than 20 mole % of all dicarboxylate units in the linear polyester matrix.

According to a fourth embodiment of the non-transparent microvoided axially stretched self-supporting film, according to the present invention, the film is a biaxially stretched film.

According to a fifth embodiment of the non-transparent microvoided axially stretched self-supporting film, according to the present invention, the weight ratio of the linear polyester to the non-crosslinked SAN-polymer is in the range of 2.3:1 to 13:1, with a range of 2.5:1 to 10:1 being preferred and a range of 2.7:1 to 9.0:1 being particularly preferred.

According to a sixth embodiment of the non-transparent microvoided axially stretched self-supporting film, according to the present invention, the weight ratio of the linear polyester to the non-crosslinked SAN-polymer is in the range of 2.85:1 to 7.0:1, with a range of 3.0:1 to 5.5:1 being preferred and a range of 3.2:1 to 4.9:1 being particularly preferred.

According to a seventh embodiment of the non-transparent microvoided axially stretched self-supporting film, according to the present invention, the non-transparent microvoided axially stretched self-supporting film is provided with at least one of alphanumeric characters, an embossed pattern, an optionally embossed hologram and a continuous, half-tone or digital image.

According to an eighth embodiment of the non-transparent microvoided axially stretched self-supporting film, according to the present invention, the film is provided on at least one side with a transparent overprintable layer i.e. suitable for impact or non-impact printing. This transparent overprintable layer can be provided over at least one of alphanumeric characters, an embossed pattern, an optionally embossed hologram and a continuous, half-tone or digital image on a surface of the non-transparent microvoided axially stretched self-supporting film.

According to a ninth embodiment of the non-transparent microvoided axially stretched self-supporting film, according to the present invention, the film is provided on at least one side with a transparentizable porous overprintable layer i.e. suitable for impact or non-impact printing e.g. ink-jet printing. Transparentizable porous layers transparentized by the application of a liquid with an appropriate refractive index, which can also be applied image-wise, are as disclosed in EP-A 1 362 710 and EP-A 1 398 175. This transparentizable overprintable layer can be provided over at least one of alphanumeric characters, an embossed pattern, an optionally embossed hologram and a continuous, half-tone or digital image on a surface of the non-transparent microvoided axially stretched self-supporting film with a transparent pattern.

Transparentization of part of the transparentizable porous receiving layer can itself produce an image or the non-transparentized area of the opaque porous receiving layer can itself represent an image. The transparent pattern can, for example, be part of a banknote, a share certificate, a ticket, a credit card, an identity document or a label for luggage and packages.

According to a tenth embodiment of the non-transparent microvoided axially stretched self-supporting film, according to the present invention, the non-transparent microvoided axially stretched self-supporting film has a thickness in the range from about 15 µm to about 500 µm, with from about 25 µm to about 300 µm being preferred, from about 50 µm to about 200 µm being particularly preferred and from about 75 to about 150 µm being especially preferred.

According to an eleventh embodiment of the non-transparent microvoided axially stretched self-supporting film, according to the present invention, the non-transparent microvoided axially stretched self-supporting film is provided with a subbing layer.

According to a twelfth embodiment of the non-transparent microvoided axially stretched self-supporting film, according to the present invention, the film is exclusive of foam.

According to a thirteenth embodiment of the non-transparent microvoided axially stretched self-supporting film, according to the present invention, the film is exclusive of foaming agent and/or decomposition products of a foaming agent.

According to a fourteenth embodiment of the non-transparent microvoided axially stretched self-supporting film, according to the present invention, the non-transparent microvoided axially stretched self-supporting film further contains an electroconductivity enhancing additive e.g. a metallic salt which ionizes in the melt giving enhanced electroconductivity such as magnesium acetate, manganese salts and cobalt sulphate. Suitable salt concentrations are about $3.5 \times 10^{-4}$ moles/mole polyester. Enhanced polyester melt viscosity enables improved pinning of the melt on the chilling roller maintained at a temperature of 5 to 25° C. (preferably 15 to 30° C.) to cool the extrudate thereby enabling higher stretching forces to be realized and hence enhanced void-forming and a higher degree of opacification.

Process for Producing a Non-Transparent Microvoided Axially Stretched Film

Aspects of the present invention are also realized by a process for preparing a non-transparent microvoided axially stretched film comprising the steps of: i) mixing at least one linear polyester having monomer components selected from the group consisting of at least one aromatic dicarboxylic acid and at least one aliphatic diol, a non-crosslinked random SAN-polymer and at least one ingredient from the group of ingredients consisting of inorganic opacifying pigments, whitening agents, colorants, UV-absorbers, light stabilizers, antioxidants and flame retardants in a kneader or an extruder to produce a mixture comprising the non-crosslinked random SAN-polymer in a polyester matrix, ii) forming the mixture produced in step i) in a thick film followed by quenching e.g. to room temperature; and iii) stretching said thick film at a stretching tension of >2.5 N/mm$^2$ at a temperature between the glass transition temperature of said SAN-polymer and the glass transition temperature of said linear polyester to at least twice the initial length, wherein the weight ratio of the polyester matrix to said non-crosslinked random SAN-polymer is in the range of 2.0:1 to 19.0:1 and wherein one of said at least one aromatic dicarboxyate monomer units is isophthalate and said isophthalate is present in said polyester matrix in a concentration of 15 mole % or less of all the dicarboxylate monomer units in said linear polyester matrix.

According to a first embodiment of the process for producing a non-transparent microvoided axially stretched film, according to the present invention, the quenched extruded film has a thickness of approximately 10 µm to approximately 6000 µm, with a thickness of approximately 100 to approximately 5000 µm being preferred, a thickness of approximately 200 µm to approximately 3000 µm being particularly preferred and a thickness of approximately 500 µm to approximately 2000 µm being especially preferred.

The non-transparent microvoided axially-stretched film is produced by orienting the thick film by stretching e.g. in the machine direction or in a direction perpendicular to the machine direction (the transversal direction). Preferably the non-transparent microvoided axially-stretched film is biaxially stretched. Biaxial stretching is realized by orienting the film by first stretching in one direction (e.g. in the machine direction=MD) and then stretching in a second direction [e.g. perpendicularly to the machine direction=TD (transversal direction)]. This orients the polymer chains thereby increasing the density and crystallinity. Longitudinal orientation in the direction of extrusion can be carried out with the aid of two rolls running at different speeds corresponding to the desired stretching ratio by setting the surface speed V2 of the rotating rollers relative to the linear extrusion speed V1 so that the stretch ratio is V2/V1. The longitudinal stretching ratio should be sufficient to create voids.

The longitudinal stretching operations known in the art to produce axially and biaxially oriented polyester film may be used. For instance, the combined film layers are passed between a pair of infra red heaters which heats the layers to a temperature above the glass transition temperature of the polyester (about 80° C. for polyethylene terephthalate) in the region where the stretching occurs. The stretching temperatures should be close to the glass transition temperature of the continuous phase polymer in order to improve opacity. Furthermore, the stretching temperatures should be below the glass transition temperature of the PETSAN-polymer. In the case of polyethylene terephthalate, the longitudinal stretching is generally carried out at from about 80 to about 130° C. During longitudinal stretching opacity is realized as a result of the voids produced in the film extending longitudinally from each particle of dispersed polymer.

Transverse stretching is carried out at an angle substantially 90° to the direction of longitudinal stretching, with the angle being typically between about 70° and 90°. For transverse orientation use is generally made of an appropriate tenter frame, clamping both edges of the film and then drawing toward the two sides by heating the combined layers with the primer layer(s) thereon by, for example, passing through hot air heaters which heat the film above the glass transition temperature. In the case of polyethylene terephthalate, the transverse stretching is carried out at from about 80 to about 170° C., preferably from about 90 to about 150° C. The transverse stretching of the film causes the voids to extend transversely.

According to a second embodiment of the process for producing a non-transparent microvoided axially stretched film, according to the present invention, the stretching of the thick film is performed at a stretching tension >2.5 N/mm$^2$, with a stretching tension >5.0 N/mm$^2$ being preferred and a stretching tension >7.0 N/mm$^2$ being particularly preferred. The stretching tension increases with decreasing stretching temperature.

According to a third embodiment of the process for producing a non-transparent microvoided axially stretched film, according to the present invention, the film is biaxially stretched.

According to a fourth embodiment of the process for producing non-transparent microvoided axially stretched film, according to the present invention, the process comprises a further step, step (iv), in which the film is subjected to a further stretching process at an angle substantially 90° to the first stretching process to at least twice the initial length at a stretching tension of >2.5 N/mm$^2$, with a stretching tension of >4.0 N/mm$^2$ being preferred.

According to a fifth embodiment of the process for producing non-transparent microvoided axially stretched film, according to the present invention, the process comprises a further step, step (iv), in which the film is subjected to a further stretching process at an angle substantially 90° to the first stretching process to at least twice the initial length at a stretching tension of >2.5 and step iv) is performed at a temperature at or below 30° C. above the glass transition temperature of the linear polyester matrix, with a temperature at or below 20° C. above the glass transition temperature of the linear polyester matrix being preferred and a temperature at or below 10° C. above the glass transition temperature of the linear polyester matrix being particularly preferred. The realizable stretching tension increases with decreasing stretching temperature.

According to a sixth embodiment of the process for producing non-transparent microvoided axially stretched film, according to the present invention, steps iii) and iv) are performed simultaneously e.g. with an apparatus produced by Brückner.

According to a seventh embodiment of the process for producing a non-transparent microvoided axially stretched film, according to the present invention, the process further comprises, as a fifth step, a thermal fixation step.

According to an eighth embodiment of the process for producing a non-transparent microvoided axially stretched film, according to the present invention, the stretching ratio for longitudinal stretching is between about 2 and about 6, with between about 2.5 and about 5 being preferred and between 3 and 4 being particularly preferred. The higher the stretching ratio, the higher is the opacity.

According to a ninth embodiment of the process for producing a non-transparent microvoided axially stretched film, according to the present invention, the transverse stretching ratio is in the range of from about 2 to about 6, with a range of 2.5 to about 5 being preferred and a range of from about 3 to about 4 being particularly preferred. The higher the stretching ratio, the higher is the opacity. Furthermore, the higher in %/min the stretching rate, the higher the opacity.

According to a tenth embodiment of the process for producing a non-transparent microvoided axially stretched film, according to the present invention, the linear polyester does not have butylene terephthalate as the main component.

The axially or biaxially stretched film is finally passed through a second set of hot air heaters which blow hot air at a temperature of between 160 and 240° C. onto the film layers to heat-set or thermofix the film layers. The heat-set temperature must be sufficient to obtain crystallization of the polyester but care must be taken not to overheat the layers since the voids can collapse. On the other hand increasing the heat-set temperature improves the dimensional stability of the film. An appropriate mix of properties can be obtained by varying the heat-set temperature. The preferred heat-set or thermofixation temperature in the case of polyethylene terephthalate or polyethylene naphthalate is at least 140° C. and preferably at least 150° and particularly preferably at least 175° C.

Before or after longitudinal stretching a first subbing layer, called a primer layer, may be applied to the non-voided polyester layer by a coating means such as an air knife coating system. The first subbing layer is for example formed from a (meth)acrylate copolymer, a poly(meth)acrylate, a polyurethane, a sulphonated polyester or a chloride containing copolymer such as vinylidene chloride copolymer in latex form having some hydrophilic functionality through the presence of a copolymerized unsaturated carboxylic acid which is applied as an aqueous dispersion.

Optical Density of the Film Due to Microvoids

The optical density of the film measured in transmission with a visible filter due to microvoids is obtained by measuring the optical density of the film without void-producing ingredients as a function of film thickness to provide comparative values. The optical density of a film measured in transmission with a visible filter due to voids is then obtained by biaxially stretching a composition to which has been added the void-inducing ingredient and subtracting the measured optical density measured in transmission with a visible filter from the optical density measured in transmission with a visible filter for the film composition without void-inducing ingredient for the film thickness expected on the basis of the longitudinal and transverse drawing ratios.

Linear Polyester

According to a fifteenth embodiment of the non-transparent microvoided axially stretched film according to the present invention, the linear polyester comprises at least one aromatic polyester resin e.g. poly(ethylene terephthalate) or a copolymer thereof. Upon heating, e.g. during mixing in an extruder, the different linear polyester resins present will undergo metathesis, condensing and decondensing so as to evolve upon sufficiently long heating into a single resin.

According to a sixteenth embodiment of the non-transparent microvoided axially stretched film according to the present invention, the linear polyester comprises isophthalate monomer units in a concentration in respect of the total concentration of dicarboxylate monomer units of at least 1 mole %, with at least 3 mole % being preferred and at least 5 mole % being particularly preferred.

According to a seventeenth embodiment of the non-transparent microvoided axially stretched film according to the present invention, the linear polyester comprises isophthalate monomer units in a concentration in respect of the total concentration of dicarboxylate monomer units of 12 mole % or less.

According to an eighteenth embodiment of the non-transparent microvoided axially stretched film according to the present invention, the linear polyester is a copolymer of polyethylene terephthalate.

According to an nineteenth embodiment of the non-transparent microvoided axially stretched film according to the present invention, the linear polyester comprises polyethylene terephthalate and a copolymer of ethylene terephthalate and ethylene isophthalate.

Suitable polyesters include those produced from aromatic, aliphatic, or cyclo-aliphatic dicarboxylic acids or their esters, the dicarboxylate group having 4-20 carbon atoms, and aliphatic (including alicyclic) glycols or ethers thereof, the aliphatic dimethylene groups having 2-24 carbon atoms, and mixtures thereof. Examples of suitable aromatic dicarboxylates include terephthalate, isophthalate, phthalate, naphthalene dicarboxylates and sodiosulfoisophthalate. Examples of suitable aliphatic dicarboxylates include succinate, glutarate, adipate, azelaiate (from azelaic acid), sebacate, fumarate, maleiate (from maleic acid) and itaconate. Examples of suitable alicyclic dicarboxylate are 1,4-cyclohexane-dicarboxylate, 1,3-cyclohexane-dicarboxylate and 1,3-cyclopentane-dicarboxylate. Examples of suitable aliphatic dimethylenes include ethylene, propylene, methylpropylene, tetramethylene, pentamethylene, hexamethylene, neopentylene [—$CH_2C(CH_3)_2$—$CH_2$], 1,4-cyclohexane-dimethylene, 1,3-cyclohexane-dimethylene, 1,3-cyclopentane-dimethylene, norbornane-dimethylene, —$CH_2CH_2(OCH_2CH_2)_n$—, where n is an integer with 1 to 5 being preferred, and mixtures thereof.

Such polyesters are well known in the art and may be produced by well-known techniques, for example, those described in U.S. Pat. No. 2,465,319 and U.S. Pat. No. 2,901,466.

According to a twentieth embodiment of the non-transparent microvoided axially stretched self-supporting film, according to the present invention, the linear polyester is a polymer having aromatic dicarboxylic acids selected from the group consisting of terephthalic acid, isophthalic acid and naphthalene dicarboxylic acid.

According to a twenty-first embodiment of the non-transparent microvoided axially stretched self-supporting film, according to the present invention, the linear polyester is a polymer having aliphatic diols selected from the group consisting of ethylene glycol, 1,4-butanediol, neopentyl glycol, 2-endo,3-endo norbornane dimethanol and 1,4-cyclohexanedimethanol, with a combination of ethylene glycol and 1,4-cyclohexanedimethanol being preferred.

According to a twenty-second embodiment of the non-transparent microvoided axially stretched film, according to the present invention, the linear polyester comprises polyethylene terephthalate and a copolymer of ethylene terephthalate and 1,4-cyclohexylene dimethylene terephthalate.

According to a twenty-third embodiment of the non-transparent microvoided axially stretched film, according to the present invention, at least 1 mole % of the aliphatic dimethylene monomer units in the linear polyester are neopentylene or 1,4-cyclohexanedimethylene monomer units, with at least 3 mole % being preferred and at least 5 mole % being particularly preferred.

According to a twenty-fourth embodiment of the non-transparent microvoided axially stretched film according to the present invention, the number average molecular weight of the linear polyester is 10,000 to 30,000.

Poly(ethylene terephthalate) modified by small amounts of other monomers is especially preferred. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. No. 4,420,607, U.S. Pat. No. 4,459,402 and U.S. Pat. No. 4,468,510.

According to a twenty-fifth embodiment of the non-transparent microvoided axially stretched self-supporting film, according to the present invention, the linear polyester has a glass transition temperature from 40 to 150° C., preferably from 50 to 120° C. and particularly preferably from 60 to 100° C.

According to a twenty-sixth embodiment of the non-transparent microvoided axially stretched self-supporting film, according to the present invention, the linear polyester is orientable.

According to a twenty-seventh embodiment of the non-transparent microvoided axially stretched self-supporting film, according to the present invention, the linear polyester has an inherent viscosity determined in a 0.5 g/dL solution of 60 wt % phenol and 40 wt % ortho-dichlorobenzene at 25° C. of at least 0.45 dl/g with an inherent viscosity of 0.48 to 0.9 dl/g being preferred and an inherent viscosity of 0.5 to 0.85 dl/g being particularly preferred and an inherent viscosity of 0.55 to 0.8 dl/g being especially preferred.

According to a twenty-eighth embodiment of the non-transparent microvoided axially stretched self-supporting film, according to the present invention, the linear polyester does not have butylene terephthalate as the main component.

Mixtures of polyesters undergo metathesis during mixing in the melt resulting in a copolymer being formed with the overall composition of the mixture. Examples of a suitable matrix include a blend comprising poly(ethylene terephthalate) and poly(1,4-cyclohexylene dimethylene terephthalate).

Random SAN-Polymer

According to a twenty-ninth embodiment of the non-transparent microvoided axially stretched film according to the present invention, the concentration of SAN-polymer is at least 5% by weight, with at least 10% by weight being preferred and at least 15% by weight being particularly preferred.

According to a thirtieth embodiment of the non-transparent microvoided axially stretched film according to the present invention, the concentration of SAN-polymer is 35% by weight or less, with 30% or less being preferred and 25% by weight or less being particularly preferred.

According to a thirty-first embodiment of the non-transparent microvoided axially stretched film according to the present invention, the concentration of AN-monomer units in the SAN-polymer is 15 to 35% by weight, with 18 to 32% by weight being preferred and 21 to 30% by weight being particularly preferred.

The SAN polymer additive of the present composition is a known genus of polymer consisting essentially of a styrenic monomer component, including styrene as well as an alpha-lower alkyl-substituted styrene or mixtures thereof and an acrylonitrilic monomer component including acrylonitrile as well as an alpha-lower alkyl substituted acrylonitrile or mixtures thereof. By lower-alkyl is meant a straight or branched chain alkyl group of 1 to 4 carbon atoms exemplified by the methyl, ethyl, isopropyl and t-butyl groups. In readily available SAN polymers, the styrene component is generally styrene, alpha-straight chain alkyl substituted styrene, typically alpha-methyl-styrene, or mixtures thereof with styrene being preferred. Similarly in the readily available SAN polymers, the acrylonitrile component is generally acrylonitrile, alpha-methyl-acrylonitrile or mixtures thereof with acrylonitrile being preferred.

In the SAN polymer the styrene component is present in a major weight proportion, i.e. in a weight proportion of greater than 50%, typically about 65% to about 90%, especially about 70% to about 80%, based on the combined weight of the styrene component and the acrylonitrile component. The acrylonitrile component is present in a minor proportion, i.e. in a weight proportion of less than 50%, typically about 10% to about 35% especially about 20% to 30% based on the combined weight of the styrene monomer component and the acrylonitrile monomer component.

The SAN polymer class is more particularly identified and described in R. E. Gallagher, U.S. Pat. No. 3,988,393, issued Oct. 26, 1976 (especially at Column 9, lines 14-16 and in claim 8), in "Whittington's Dictionary of Plastics", Technomic Publishing Co., First Edition, 1968, page 231, under the section headed "Styrene-Acrylonitrile Copolymers (SAN)", and R. B. Seymour, "Introduction to Polymer Chemistry", McGraw-Hill, Inc., 1971, page 200, (last two lines) to page 201 (first line). The preparation of a SAN polymer by copolymerization of styrene and acrylonitrile is more particularly described in the "Encyclopedia of Polymer Science and Technology", John Wiley and Sons, Inc., Vol. 1, 1964, pages 425-435.

According to a thirty-second embodiment of the non-transparent microvoided axially stretched film, according to the present invention, the number average molecular weight of the non-crosslinked random SAN-polymer is 30,000 to 100,000, with 32,000 to 80,000 being preferred, 35,000 to 70,000 being particularly preferred and 40,000 to 60,000 being especially preferred. Typical SAN-polymers have number averaged molecular weights of 45,000 to 60,000 and polymer dispersities ($M_w/M_n$) of 1.2 to 2.5.

According to a thirty-third embodiment of the non-transparent microvoided axially stretched self-supporting film, according to the present invention, the weight average molecular weight of the non-crosslinked random SAN-polymer is in the range of 50,000 to 200,000, preferably in the range of 75,000 to 150,000.

According to a thirty-fourth embodiment of the non-transparent microvoided axially stretched film, according to the present invention, the dispersed SAN-polymer has a number averaged particle size of 1.5 µm. The smaller the particle size of the dispersed SAN-polymer, the higher the opacity.

Inorganic Opacifying Pigment

According to a thirty-fifth embodiment of the non-transparent microvoided axially stretched self-supporting film, according to the present invention, the concentration of inorganic opacifying pigment is ≧0.1% by weight, with ≧1% by weight being preferred.

According to a thirty-sixth embodiment of the non-transparent microvoided axially stretched film of the present invention, the inorganic opacifying pigment is present in a concentration of ≦10% by weight, with ≦3% by weight being preferred.

According to a thirty-seventh embodiment of the non-transparent microvoided axially stretched self-supporting film, according to the present invention, the film comprises ≦10% by weight of inorganic opacifying pigment each with a refractive index of less than 2.0, with ≦3% by weight being preferred.

According to a thirty-eighth embodiment of the non-transparent microvoided axially stretched self-supporting film, according to the present invention, the film comprises ≦10% by weight of inorganic opacifying pigment each with a refractive index of at least 1.5.

According to a thirty-ninth embodiment of the non-transparent microvoided axially stretched self-supporting film, according to the present invention, the film further comprises an inorganic opacifying pigment having a number averaged particle size between 0.1 and 10 µm, with 0.2 to 2 µm being preferred and 0.2 to 1 µm being particularly preferred.

According to a fortieth embodiment of the transparent pattern in a non-transparent microvoided axially stretched self-supporting film, according to the present invention, the film further comprises an inorganic opacifying pigment selected from the group consisting of silica, zinc oxide, zinc sulphide, lithopone, barium sulphate, calcium carbonate, titanium dioxide, aluminium phosphate and clays. The titanium dioxide may have an anatase or rutile morphology and may be stabilized by alumina oxide and/or silicon dioxide. The aluminium phosphate can be an amorphous hollow pigment e.g. the Biphor™ pigments from BUNGE.

The refractive indices of these pigments is given in the table below:

| inorganic opacifying pigment | refractive index for sodium line at 589.3 nm |
| --- | --- |
| kaolinite | 1.53-1.57 |
| bentonite | 1.557 |
| china clay | 1.56 |
| silica - silica gel | 1.55 |
| silica - cristobalite | 1.487, 1.484 |
| silica - quartz | 1.544, 1.553 |
| calcium carbonate | 1.59, 1.6, 1.58 |
| calcium carbonate - calcite | 1.486, 1.64-1.66 |
| barium sulphate - baryte | 1.637, 1.638, 1.649, 1.64 |
| Lithopone 30% (zinc sulphide/barium sulphate) | 1.84 |
| zinc oxide (ultrafine) | 1.9 |
| zinc oxide (zincite) | 2.008, 2.029 |
| zinc sulphide | 2.37 |
| titanium dioxide - anatase | 2.554, 2.493, 2.55 |
| titanium dioxide - rutile | 2.616, 2.903, 2.76 |

Addition of an inorganic opacifying pigment has the advantage of stabilizing the orientation of the polyester, so that the non-transparent microvoided axially stretched self-supporting film can be stabilized at temperatures of 175° C. without substantially affecting the opacity of the non-transparent microvoided axially stretched self-supporting film. Without the presence of an inorganic opacifying pigment, such as $BaSO_4$ or $TiO_2$, thermofixing of the polyester is possible, but only at the expense of some of the opacity of the non-transparent microvoided axially stretched self-supporting film. Moreover, pigments with a refractive index below 2.0, such as $BaSO_4$, do not of themselves provide substantial opacity due to the small refractive index differences between the pigment and the polymer matrix.

Titanium dioxide particles dispersed in polymer films have of themselves been found not to induce microvoiding upon stretched the films.

Whitening Agent

According to a forty-first embodiment of the non-transparent microvoided axially stretched film, according to the present invention, According to a third embodiment of the process for obtaining a transparent pattern, according to the present invention, the concentration of whitening agent is ≦0.5% by weight, with ≦0.1% by weight being preferred, ≦0.05% by weight being particularly preferred, ≦0.035% by weight being especially preferred.

According to a forty-second embodiment of the non-transparent microvoided axially stretched self-supporting film, according to the present invention, the film further comprises a whitening agent selected from the group consisting of bis-benzoxazoles e.g. bis-benzoxazolyl-stilbenes and bis-benzoxazolyl-thiophenes; benzotriazole-phenylcoumarins; naphthotriazole-phenylcoumarins; triazine-phenylcoumarins and bis(styryl)biphenyls.

Suitable whitening agents are:

| | | Manufacturer |
| --- | --- | --- |
| UVITEX ® OB | | CIBA |
| UVITEX ® OB-ONE | | CIBA |
| Eastobrite OB | 2,5-thiophenediylbis(5-tert-butyl-1,3-benzoxazole) bis-benzoxazolyl-stilbene bis-benzoxazolyl-thiophene | Eastman Chemical |

Flame Retardant

According to a forty-third embodiment of the non-transparent microvoided axially stretched self-supporting film, according to the present invention, the film further comprises a flame retardant.

According to a forty-fourth embodiment of the non-transparent microvoided axially stretched self-supporting film, according to the present invention, the film further comprises a flame retardant selected from the group consisting of: brominated compounds; organophosphorus compounds; melamine; melamine-derivatives, e.g. melamine salts with organic or inorganic acids such as boric acid, cyanuric acid, phosphoric acid or pyro/poly-phosphoric acid, and melamine homologues such as melam, melem and melon; metal hydroxides e,g. aluminium hydroxide and magnesium hydroxide; ammonium polyphosphates and zinc borate e.g. with a composition of $xZnO.yB_2O_3.zH_2O$ such as $2ZnO.3B_2O_3.3.5H_2O$.

Suitable flame retardants include:

| | | Manufacturer |
| --- | --- | --- |
| SAYTEX ® HP-7010 P/G | brominated polystyrene | Albemarle Corporation |
| SAYTEX ® HP-3010 | brominated polystyrene | Albemarle Corporation |
| SAYTEX ® 8010 | ethane-1,2-bis(pentabromo-phenyl) | Albemarle Corporation |
| SAYTEX ® BT-93 | ethylene bis-tetrabromo-phthalimide | Albemarle Corporation |
| SAYTEX ® BT-93W | Ethylene bis-tetrabromo-phthalimide | Albemarle Corporation |
| SAYTEX ® CP-2000 | brominated compound | Albemarle Corporation |
| SAYTEX ® 120 | tetradecabromo-diphenoxy benzene | Albemarle Corporation |

-continued

| | | Manufacturer |
|---|---|---|
| SAYTEX ® 102E | Decabromodiphenyl oxide | Albemarle Corporation |
| SAYTEX ® 9006L | brominated compound | Albemarle Corporation |
| SAYTEX ® HP-900 | brominated compound | Albemarle Corporation |
| SAYTEX ® HP-800A | brominated compound | Albemarle Corporation |
| SAYTEX ® HP-800AG | brominated compound | Albemarle Corporation |
| SAYTEX ® BC70HS | brominated compound | Albemarle Corporation |
| NcendX P-30 | organophosphorus compound | Albemarle Corporation |
| MARTINAL ® OL-104 | aluminium hydroxide | Albemarle Corporation |
| MARTINAL ® OL-104/LE | aluminium hydroxide | Albemarle Corporation |
| MARTINAL ® OL-104/WE | aluminium hydroxide | Albemarle Corporation |
| MARTINAL ® OL-104/LFF | aluminium hydroxide | Albemarle Corporation |
| MARTINAL ® OL-104/LCD | aluminium hydroxide | Albemarle Corporation |
| MARTINAL ® OL-107 | aluminium hydroxide | Albemarle Corporation |
| MARTINAL ® OL-107/LE | aluminium hydroxide | Albemarle Corporation |
| MARTINAL ® OL-107/LFF | aluminium hydroxide | Albemarle Corporation |
| MARTINAL ® OL-107/LCD | aluminium hydroxide | Albemarle Corporation |
| MARTINAL ® OL/Q-107 | aluminium hydroxide | Albemarle Corporation |
| MARTINAL ® OL-111/LE | aluminium hydroxide | Albemarle Corporation |
| MAGNIFIN ® H3 | magnesium hydroxide | Albemarle Corporation |
| MAGNIFIN ® H5 | magnesium hydroxide | Albemarle Corporation |
| MAGNIFIN ® H7 | magnesium hydroxide | Albemarle Corporation |
| MAGNIFIN ® H10 | magnesium hydroxide | Albemarle Corporation |
| MAGNIFIN ® T2C | magnesium hydroxide | Albemarle Corporation |
| MAGNIFIN ® T3C | magnesium hydroxide | Albemarle Corporation |
| MELAPUR ® MCXL | melamine cyanurate | CIBA |
| MELAPUR ® MC50 | melamine cyanurate | CIBA |
| MELAPUR ® MC25 | melamine cyanurate | CIBA |
| MELAPUR ® 200 70 | melamine polyphosphate | CIBA |
| MELAPUR ® MP | melamine phosphate | CIBA |
| FIREBRAKE ® ZB | a zinc borate compound | LUZENAC |
| FIREMASTER ® PBS-64 | brominated styrene-based technology | GREAT LAKES CHEMICAL CORP. |
| FIREMASTER ® PBS-64HW | brominated styrene-based technology | GREAT LAKES CHEMICAL CORP. |
| FIREMASTER ® CP-44B | copolymer of brominated styrene & glycidyl methacrylate | GREAT LAKES CHEMICAL CORP. |

Antioxidant

According to a forty-fifth embodiment of the non-transparent microvoided axially stretched self-supporting film, according to the present invention, the film further comprises an antioxidant.

According to a forty-sixth embodiment of the non-transparent microvoided axially stretched self-supporting film, according to the present invention, the film further comprises an antioxidant selected for the group consisting of organotin derivatives, sterically hindered phenols, sterically hindered phenol derivatives and phosphites.

Suitable flame retardants include:

| | | Manufacturer |
|---|---|---|
| ETHANOX ® 310 | Organotin catalyzed penta-erythritol tetrakis (3-(3,5-di-t-butyl-4-hydroxyphenyl)-propionate) | Albemarle Corporation |

-continued

| | | Manufacturer |
|---|---|---|
| ETHANOX ® 310TF | "Tin-free" pentaerythritol tetrakis (3-(3,5-di-t-butyl-4-hydroxyphenyl)propionate) | Albemarle Corporation |
| ETHANOX ® 314 | 1,3,5-tris(3,5-di-tert-butyl-4-hydroxybenzyl)-1,3,5-tria-zine-2,4,6(1h,3h,5h)-trione | Albemarle Corporation |
| ETHANOX ® 330 | 1,3,5-trimethyl-2,4,6-tris (3,5-di-tert-butyl-4-hydroxy-benzyl) benzene | Albemarle Corporation |
| ETHANOX ® 376 | octadecyl-3-(3,5-di-t-butyl-4-hydroxyphenyl)-propionate | Albemarle Corporation |
| ETHAPHOS ™ 368 | tris-(2,4-di-t-butylphenyl) phosphite | Albemarle Corporation |
| ETHAPHOS ™ 326 | Bis (2,4-di-t-butylphenyl) pentaerythritol diphosphite | Albemarle Corporation |
| IRGANOX ® 259 | | CIBA |
| IRGANOX ® 1010 | | CIBA |
| IRGANOX ® 1425 | | CIBA |
| IRGANOX ® B 900 | | CIBA |
| HOSTANOX ® O 3 | Bis[3,3'-bis-(4'-hydroxy-3'-tert-butyl-phenyl)butanoic acid]glycol ester | CLARIANT |
| HOSTANOX ® O 10 | tetrakis[methylene(3,5-di-t-butyl-4-hydroxy-benzyl)isocyanurate | CLARIANT |
| HOSTANOX ® O 310 | 1/1 mixture of HOSTANOX ® O 10 & HOSTANOX ® O 3 | CLARIANT |
| HOSTANOX ® 245 | ethylene bis(oxyethylene)bis-[3-(5-t-butyl-4-hydroxy-m-tolyl)-propionate] | CLARIANT |

Light Stabilizers

According to a forty-seventh embodiment of the non-transparent microvoided axially stretched self-supporting film, according to the present invention, the film further comprises a light stabilizer.

According to a forty-eighth embodiment of the non-transparent microvoided axially stretched self-supporting film, according to the present invention, the film further comprises a hindered amine light stabilizer.

Suitable light stabilizers include:

| | | Manufacturer |
|---|---|---|
| LS-01 | CHIMASSORB 119 | CIBA |
| LS-02 | CHIMASSORB 944 | CIBA |
| LS-03 | TINUVIN ® 123 | CIBA |
| LS-04 | TINUVIN ® 144 | CIBA |
| LS-05 | TINUVIN ® 622 | CIBA |
| LS-06 | TINUVIN ® 765 | CIBA |
| LS-07 | TINUVIN ® 770 | CIBA |
| LS-08 | TINUVIN ® 783 | CIBA |
| LS-09 | TINUVIN ® 791 | CIBA |
| LS-10 | TINUVIN ® B 75 | CIBA |
| LS-11 | TINUVIN ® B 241 | CIBA |

UV-Absorbers

According to a forty-ninth embodiment of the non-transparent microvoided axially stretched self-supporting film, according to the present invention, the film further comprises a UV-absorber.

According to a fiftieth embodiment of the non-transparent microvoided axially stretched self-supporting film, according to the present invention, the film further comprises an UV-absorber selected from the group consisting of benzotriazole derivatives and triazine derivatives.

Suitable UV-absorbers include:

| | | | Manufacturer |
|---|---|---|---|
| UV-01 | CHIMASSORB | | CIBA |
| UV-02 | TINUVIN ® 213 | | CIBA |
| UV-03 | TINUVIN ® 234 | | CIBA |
| UV-04 | TINUVIN ® 327 | | CIBA |
| UV-05 | TINUVIN ® 360 | | CIBA |
| UV-06 | TINUVIN ® 1577 | | CIBA |
| UV-07 | HOSTAVIN ® PR-25 | propanedioic acid,[(4-methoxy-phenyl)-methylene]-, dimethyl ester | CLARIANT |
| UV-08 | SANDUVOR ® VSU | 2-ethyl-2'-ethoxy-oxalanilide | CLARIANT |
| UV-09 | HOSTAVIN ® B-CAP | tetra-ethyl-2,2'-(1,4-phenylene-dimethylidene)-bismalonate | CLARIANT |
| UV-10 | HOSTAVIN ® ARO 8 | 2-hydroxy-4-n-octyloxybenzophenone | CLARIANT |

Image Recording Element

Aspects of the present invention are also realized by an image recording element comprising the non-transparent microvoided axially stretched film, according to the present invention.

According to a first embodiment of the image recording element, according to the present invention, the film is provided on at least one side with a transparent overprintable layer i.e. for impact and non-impact printing.

According to a second embodiment of the image recording element, according to the present invention, the film is provided on at least one side with a non-transparent overprintable layer i.e. suitable for at least one impact and non-impact print technique.

According to a third embodiment of the image recording element, according to the present invention, the film is provided on at least one side with a non-transparent transparentizable overprintable layer i.e. i.e. suitable for at least one impact and non-impact print technique.

According to a fourth embodiment of the image recording element, according to the present invention, the film is provided on at least one side with an ink-jet receiving layer. Typical receiving layers are either porous in the case of aqueous or solvent inks or pastes to enable rapid drying to the touch or are non-porous in the case of phase-change inks or curable inks e.g. radiation curable inks. Porous receiving layers typically comprise at least one pigment such as silica or alumina; at least one binder, such as an ammonium salt of a styrene-acrylate-acrylic acid terpolymer; a surfactant e.g. an anionic surfactant such as an aliphatic sulphonate; optionally a levelling agent, such as polydimethylsiloxane, and optionally a mordant.

According to a fifth embodiment of the image recording element, according to the present invention, the film is provided on at least one side with an imaging layer e.g. a photographic layer e.g. a silver halide emulsion layer; a photothermographic element and a substantially light-insensitive thermographic element; and the dye receiver layer of a dye thermal transfer system.

According to a sixth embodiment of the image recording element, according to the present invention, the film is provided on at least one side with a writable layer e.g. with a pencil, ball-point pen and fountain pen.

Process for Obtaining a Transparent Pattern

Aspects of the present invention have been realized by a process for obtaining a transparent pattern comprising the step of: image-wise application of heat optionally supplemented by the application of pressure to a non-transparent microvoided axially stretched film consisting essentially of a continuous phase linear polyester matrix having dispersed therein a non-crosslinked random SAN-polymer and at least one ingredient from the group of ingredients consisting of inorganic opacifying pigments, whitening agents, colorants, UV-absorbers, light stabilizers, antioxidants and flame retardants, wherein the linear polyester has monomer components consisting essentially of at least one aromatic dicarboxylic acid, at least one aliphatic diol and optionally at least one aliphatic dicarboxylic acid, the weight ratio of the non-crosslinked SAN-polymer to the linear polyester is in the range 3.0 to 5.5 and wherein the concentration of AN-monomer units in the SAN-polymer is 18 to 35% by weight.

According to a first embodiment of the process for obtaining a transparent pattern, according to the present invention, the film is a biaxially stretched film.

According to a second embodiment of the process for obtaining a transparent pattern, according to the present invention, the concentration of inorganic opacifying pigment is $\geq 0.1\%$ by weight, preferably $\geq 1\%$ by weight.

According to a third embodiment of the process for obtaining a transparent pattern, according to the present invention, the concentration of whitening agent is $\leq 0.05\%$ by weight, with $\leq 0.035\%$ by weight being preferred.

According to a fourth embodiment of the process for obtaining a transparent pattern, according to the present invention, the heat is applied by a heated or hot stamp, a thermal head, a heated or hot bar or a laser. The heating can be carried out from one or both sides of the film. The proportionate transparentization realized upon obtaining a transparent pattern, according to the present invention, increases with decreasing film thickness, with thicknesses of 100 μm or less being preferred. Optical density changes of at least 0.4 can be readily realized or up to 40% without significant changes in film thickness. Moreover, the transparentization effect realized by the process for obtaining a transparent pattern, according to the present invention, results from a combination of heat supplied by a heat source, the pressure between the heat source and the film and the time the heat source is applied. The heat has to be applied for at least 1 ms either continuously or non-continuously. Heating with a thermal head can be with a single heat pulse, but multiple short heating pulses are preferred to avoid overheating of the heating elements. When a thermal head is used a foil can be used between the thermal head and the non-transparent microvoided axially stretched self-supporting film during the heating process e.g. a 6 μm thick PET-film can be interposed between the non-transparent microvoided film and the thermal head to prevent possible contamination of the thermal head.

Thermal head printers, such as the DRYSTAR-printers supplied by AGFA-GEVAERT N.V., can be used produce the transparent pattern of the present invention e.g. as personalized watermarks.

This transparentization effect is accompanied by a relief pattern, which can be detected by touch i.e. in a tactile manner, and by changes in glossiness. This relief pattern is more pronounced the higher the temperature of the heat source, this embossing effect increasing with temperature between 110° C. and the melting point of the linear polyester matrix. The tactile relief obtained by applying a hot stamp to a non-transparent microvoided axially stretched self-supporting film is much more pronounced than that obtained using a thermal head.

The degree of transparency realized depends upon the stamp/thermal head printing conditions: time, temperature and pressure. The thermofixation history of the material is also important. The heated-induced transparentization of the non-transparent microvoided axially stretched self-supporting film can be carried out before or after the optional application of a layer, such as an ink-jet receiving layer and before or after transparentization. The relative positioning of the transparentized areas and transparency in the support can be of value as an additional security measure.

According to a fifth embodiment of the process for obtaining a transparent pattern, according to the present invention, the heat is applied non-continuously.

According to a sixth embodiment of the process for obtaining a transparent pattern, according to the present invention, a transparent overprintable layer is provided on the film prior to the image-wise application of heat.

According to a seventh embodiment of the process for obtaining a transparent pattern, according to the present invention, a transparent overprintable layer is provided on the film after the image-wise application of heat.

INDUSTRIAL APPLICATION

Non-transparent microvoided axially stretched films, according to the present invention, can be used as synthetic paper for printing and other applications, as a support for non-photographic imaging materials e.g. impact and non-impact (e.g. electrophotography, electrography and ink jet) receiving materials, photothermographic recording materials, substantially light-insensitive thermographic recording materials, dye sublimation printing, thermal transfer printing, etc., in security and anti-counterfeiting applications e.g. in tickets, labels, tags, an ID-card, a bank card, a legal document, banknotes and packaging and can also be integrated into packaging.

The invention is illustrated hereinafter by way of comparative examples and invention examples. The percentages and ratios given in these examples are by weight unless otherwise indicated.

Subbing Layer Nr. 01 on the Emulsion Side of the Support:

| | |
|---|---|
| copolymer of 88% vinylidene chloride, 10% methyl acrylate and 2% itaconic acid | 79.1 mg/m$^2$ |
| Kieselsol ® 100F, a colloidal silica from BAYER | 18.6 mg/m$^2$ |
| Mersolat ® H, a surfactant from BAYER | 0.4 mg/m$^2$ |
| Ultravon ® W, a surfactant from CIBA-GEIGY | 1.9 mg/m$^2$ |

Ingredients used in the EXAMPLES:

Polyester:

| PET-nr | | | MFI 270° C./ 1.20 kg [cm$^3$/10 min] | Inherent viscosity** [η] [dl/g] | $T_g$ [° C.] |
|---|---|---|---|---|---|
| 01 | T03* | polyethylene terephthalate | 34.8 | 0.60 | 80.5 |
| 02 | T04* | polyethylene terephthalate | 34.8 | 0.60 | 80.5 |
| 03 | WP75# | polyester of 98.5 mol % terephthalate, 1.5 mol % isophthalate and 100 mol % ethylene units | | 0.77 | 80 |
| 04 | DP9990# | polyester of 90 mol % terephthalate, 10 mol % isophthalate and 100 mol % ethylene units | | 0.60 | |
| 05 | DP9970# | polyester of 70 mol % terephthalate, 30 mol % isophthalate and 100 mol % ethylene units | | | |
| 06 | RADICRON 1480# | polyester of 100 mol % terephthalate, 73 mol % ethylene and 27 mol % neopentylene units | | | |

*AGFA-GEVAERT N.V.
La Seda
**inherent viscosity was determined in a 0.5 g/dL solution of 60 wt % phenol and 40 wt % ortho-dichlorobenzene at 25° C. in an Ubbelohde viscometer Styrene-Acrylonitrile Copolymers:

| SAN-nr | | Wt % acrylonitrile | Wt % styrene | MFI at 270° C./1.20 kg [mL/10 min] | Mn | Mw | $T_g$ [° C.] |
|---|---|---|---|---|---|---|---|
| 01 | TYRIL 905* | 20 | 80 | 7.1 | | | 105.2 |
| 02 | TYRIL 867E* | 25 | 75 | 5.8 | | | 106.5 |
| 03 | SAN 140* | 27.5 | 72.5 | 53.2 | 47,640 | 99,820 | 108.8 |
| 04 | LURAN 368R# | 28 | 72 | 3.9 | | | 107.3 |
| 05 | TYRIL 790* | 29 | 71 | 12.1 | | | 106.3 |
| 06 | SAN 124* | 28.5 | 71.5 | 37.9 | 53,940 | 109,350 | 108.1 |
| 07 | LURAN 388S# | 33 | 67 | 3.6 | | | 108.7 |

*DOW CHEMICAL
BASF
MFI = Melt Flow Index

TPX DX820: a high rigidity poly(4-methylpentene) from Mitsui Chemical

BARIUM SULPHATE: NEOBRK/renol white, a masterbatch from CLARIANT GmbH containing 50% by weight barium sulphate and 50 wt % polyester TITANIUM DIOXIDE: Renol-white/PTX 506, a masterbatch from CLARIANT GmbH containing 65% by weight $TiO_2$ and 35 wt % polyester

Examples 1 to 58

Extrudates 1 to 4 were produced by mixing the respective parts of PET 01, PET 03, of the particular SAN used, $BaSO_4$ and UVITEX OB-one given in Table 1, drying the resulting mixture at 150° C. for 4 hours under vacuum (<100 mbar), melting them in a PET-extruder and finally extruding them through a sheet die and cooling the resulting extrudates.

TABLE 1

| Extrudate nr | PET01 [wt %] | PET03 [wt %] | SAN 06 [wt %] | $BaSO_4$ [wt %] | UVITEX OB-one [ppm] | PET/SAN wt. ratio |
|---|---|---|---|---|---|---|
| 1 | 42.5 | 42.5 | 15 | 0 | — | 5.67 |
| 2 | 39.5 | 39.5 | 19 | 2 | 150 | 4.16 |
| 3 | 39.5 | 39.5 | 21 | 0 | — | 3.76 |
| 4 | 38 | 38 | 24 | 0 | — | 3.17 |

Extrudates 1 to 4 were axially stretched longitudinally with an INSTRON apparatus in which the extrudates are heated in an oven mounted on the apparatus under the conditions given in Table 2 to yield the axially stretched films of EXAMPLES 1 to 23, EXAMPLES 24 to 35, EXAMPLES 36 to 46 and EXAMPLES 47 to 58 respectively.

TABLE 2

| EXAMPLE nr | Extrudate used in film production | Stretch ratio | Stretch temperature [° C.] | Stretch tension [N/mm²] | Stretch speed [%/min] | Optical density |
|---|---|---|---|---|---|---|
| 1 | 1 | 1.8 | 85 | 2.9 | 1500 | 0.33 |
| 2 | 1 | 2.4 | 85 | 3.5 | 1500 | 0.53 |
| 3 | 1 | 2.3 | 85 | 3.7 | 1500 | 0.49 |
| 4 | 1 | 2.6 | 85 | 4.9 | 1500 | 0.47 |
| 5 | 1 | 2.8 | 85 | 5.6 | 1500 | 0.47 |
| 6 | 1 | 2.9 | 85 | 5.7 | 1500 | 0.47 |
| 7 | 1 | 1.3 | 85 | 2.4 | 750 | 0.17 |
| 8 | 1 | 2.5 | 85 | 4.8 | 1100 | 0.49 |
| 9 | 1 | 2.9 | 85 | 5.4 | 750 | 0.51 |
| 10 | 1 | 2.2 | 85 | 2.8 | 750 | 0.49 |
| 11 | 1 | 3.9 | 93 | 3.6 | 750 | 0.31 |
| 12 | 1 | 1.6 | 93 | 1.7 | 1500 | 0.17 |
| 13 | 1 | 3.2 | 93 | 3.4 | 1500 | 0.37 |
| 14 | 1 | 3.1 | 93 | 3.2 | 1500 | 0.36 |
| 15 | 1 | 2.9 | 93 | 3.0 | 1500 | 0.35 |
| 16 | 1 | 2.9 | 100 | 1.3 | 1500 | 0.19 |
| 17 | 1 | 5.2 | 100 | 1.9 | 1130 | 0.24 |
| 18 | 1 | 4.4 | 100 | 1.6 | 1130 | 0.22 |
| 19 | 1 | 4.2 | 100 | 1.6 | 1130 | 0.21 |
| 20 | 1 | 1.5 | 100 | 1.1 | 750 | 0.13 |
| 21 | 1 | 4.2 | 105 | 0.9 | 1130 | 0.16 |
| 22 | 1 | 4.0 | 105 | 0.8 | 1130 | 0.16 |
| 23 | 1 | 1.5 | 105 | 0.7 | 750 | 0.10 |
| 24 | 2 | 2.9 | 85 | 6.4 | 750 | 0.68 |
| 25 | 2 | 2.1 | 85 | 3.3 | 750 | 0.56 |
| 26 | 2 | 3.9 | 93 | 4.9 | 750 | 0.53 |
| 27 | 2 | 1.6 | 93 | 2.1 | 1500 | 0.37 |
| 28 | 2 | 3.6 | 93 | 5.9 | 1500 | 0.54 |
| 29 | 2 | 3.8 | 100 | 3.1 | 1500 | 0.47 |
| 30 | 2 | 4.0 | 100 | 3.1 | 1500 | 0.45 |
| 31 | 2 | 1.5 | 100 | 1.2 | 750 | 0.24 |
| 32 | 2 | 3.0 | 100 | 2.0 | 1500 | 0.41 |
| 33 | 2 | 2.8 | 100 | 1.9 | 1500 | 0.41 |
| 34 | 2 | 1.5 | 105 | 0.7 | 750 | 0.16 |
| 35 | 2 | 2.8 | 105 | 1.1 | 1500 | 0.31 |
| 36 | 3 | 2.8 | 85 | 6.9 | 1500 | 0.58 |
| 37 | 3 | 3.0 | 85 | 8.9 | 1500 | 0.60 |
| 38 | 3 | 3.4 | 93 | 6.5 | 1500 | 0.46 |
| 39 | 3 | 1.5 | 93 | 1.8 | 750 | 0.20 |
| 40 | 3 | 3.0 | 93 | 4.8 | 1130 | 0.46 |
| 41 | 3 | 2.9 | 93 | 4.4 | 1130 | 0.43 |
| 42 | 3 | 4.0 | 100 | 1.6 | 750 | 0.24 |
| 43 | 3 | 1.7 | 100 | 1.5 | 1500 | 0.22 |
| 44 | 3 | 1.5 | 100 | 1.5 | 1500 | 0.16 |
| 45 | 3 | 4.0 | 105 | 0.8 | 750 | 0.18 |
| 46 | 3 | 1.5 | 105 | 1.0 | 1500 | 0.14 |
| 47 | 4 | 2.7 | 85 | 6.9 | 750 | 0.62 |
| 48 | 4 | 2.0 | 85 | 4.6 | 750 | 0.69 |
| 49 | 4 | 3.6 | 93 | 5.2 | 750 | 0.45 |
| 50 | 4 | 1.8 | 93 | 2.7 | 1500 | 0.48 |
| 51 | 4 | 1.6 | 93 | 2.4 | 1500 | 0.38 |
| 52 | 4 | 3.4 | 93 | 6.0 | 1130 | 0.49 |
| 53 | 4 | 4.0 | 100 | 3.0 | 1130 | 0.34 |
| 54 | 4 | 1.5 | 100 | 1.5 | 1130 | 0.24 |

TABLE 2-continued

| EXAMPLE nr | Extrudate used in film production | Stretch ratio | Stretch temperature [° C.] | Stretch tension [N/mm²] | Stretch speed [%/min] | Optical density |
|---|---|---|---|---|---|---|
| 55 | 4 | 3.0 | 100 | 2.8 | 1500 | 0.36 |
| 56 | 4 | 2.9 | 100 | 2.8 | 1500 | 0.38 |
| 57 | 4 | 1.6 | 105 | 1.1 | 1130 | 0.15 |
| 58 | 4 | 2.8 | 105 | 1.3 | 1500 | 0.26 |

These experiments show that the opacity increased with stretching and with decreasing stretching temperature down to 85° C., just above the $T_g$ of the polyethylene terephthalate continuous phase. Furthermore, these experiments show that the optical density increased by about 0.15 upon incorporation of 3% by weight of barium sulphate. Moreover, these experiments also show that the optical density also increased with the stretching tension. Two minutes heating time was sufficient to give a self-consistent, i.e. homogeneous, group of measurements. The following equation was derived from the data of Table 2 by a partial least squares regression using Unscrambler software with quadratic effects or interactions not being found to be relevant:

$$\text{Optical density} = 1.273362 - 0.0270 \times PET/SAN \text{ wt ratio} +$$
$$0.0496 \times [\text{BaSO}_4 - \text{concentration in film in wt \%}] +$$
$$0.0394 \times [\text{stretching tension in N/mm}^2]$$

The stretching speed was not found to have a significant influence upon the optical density observed, although the results appear to show that it has a minor effect as does the stretching tension. Particularly high opacities appeared to be obtained for stretching tensions greater than 4 N/mm².

In films with a dispersion of styrene-acrylonitrile copolymer optionally together barium sulphate in a continuous phase of polyethylene terephthalate the opacity is almost exclusively due to micropores in the film, because the differences in refractive index between styrene-acrylonitrile copolymers with a refractive index of 1.56 to 1.57 and polyethylene terephthalate with a refractive index of 1.58 to 1.64 on the one hand and between barium sulphate with a refractive index of 1.63 and polyethylene terephthalate with a refractive index of 1.58 to 1.64 on the other are negligible.

Examples 59 to 78

The PET-types and SAN-types used for producing the extrudate used in producing of the films of EXAMPLES 59 to 78 are given in Table 3. The PET, SAN, BaSO₄ and UVITEX OB-one in the weight percentages given in Table 3 were mixed and then dried at 150° C. for 4 hours under vacuum (<100 mbar), the mixtures then melted in a PET-extruder and extruded through a sheet die and cooled to produce the extrudates 1, 2 and 5 to 22.

TABLE 3

| Extrudate nr | PET01 [wt %] | PET03 [wt %] | SAN type | SAN [wt %] | BaSO₄ [wt %] | OB-one [ppm] | PET/SAN wt ratio |
|---|---|---|---|---|---|---|---|
| 5 | 85 | — | 03 | 15 | 0 | — | 5.67 |
| 6 | 85 | — | 06 | 15 | 0 | — | 5.67 |
| 1 | 42.5 | 42.5 | 06 | 15 | 0 | — | 5.67 |
| 7 | 82 | — | 06 | 18 | 0 | — | 4.56 |
| 8 | 41 | 41 | 06 | 18 | 0 | — | 4.56 |
| 9 | 79 | — | 06 | 21 | 0 | — | 3.76 |
| 10 | 39.5 | 39.5 | 06 | 21 | 0 | 150 | 3.76 |
| 11 | 39.5 | 39.5 | 06 | 21 | 0 | 150 | 3.76 |
| 12 | 76 | — | 06 | 24 | 0 | — | 3.17 |
| 13 | 39.5 | 39.5 | 06 | 20 | 1 | 150 | 3.95 |
| 14 | 40.5 | 40.5 | 06 | 17 | 2 | 150 | 4.76 |
| 15 | 39.5 | 39.5 | 06 | 19 | 2 | 150 | 4.16 |
| 2 | 39.5 | 39.5 | 06 | 19 | 2 | 150 | 4.16 |
| 16 | 39.5 | 39.5 | 06 | 19 | 2 | 150 | 4.16 |
| 17 | 39.5 | 39.5 | 06 | 19 | 2 | — | 4.16 |
| 18 | 39.5 | 39.5 | 06 | 19 | 2 | 150 | 4.16 |
| 19 | 39.5 | 39.5 | 06 | 19 | 2 | 150 | 4.16 |
| 20 | 39.5 | 39.5 | 06 | 19 | 2 | 150 | 4.16 |
| 21 | 39.5 | 39.5 | 06 | 19 | 2 | 150 | 4.16 |
| 22 | 39.5 | 39.5 | 06 | 18 | 3 | 150 | 4.39 |

Extrudates 1, 2 and 5 to 22 were then stretched as given in Tables 4 and 5 for the non-barium sulphate-containing substantially opaque films of INVENTION EXAMPLES 59 to 67 and for the barium sulphate-containing substantially opaque films of INVENTION EXAMPLES 68 to 78 respectively and finally thermally fixated at 175° C. for 2 minutes.

TABLE 4

| EXAMPLE nr | Extrudate nr | SAN [wt %] | Longitudinal stretch | | Transversal stretch | | Thickness [μm] | Optical density after thermal fixation |
|---|---|---|---|---|---|---|---|---|
| | | | ratio | force* [N/mm²] | ratio | temperature [° C.] | | |
| 59 | 5 | 15 | 3.3 | 5.0 | 3.3 | 112 | — | 0.60 |
| 60 | 6 | 15 | 3.6 | 8.39 | 3.0 | 156 | 145 | 0.878 |
| 61 | 1 | 15 | 3.3 | 7.87 | 3.5 | 112 | 150 | 0.85 |
| 62 | 7 | 18 | 3.6 | 8.39 | 3.3 | 140 | 130 | 0.92 |
| 63 | 8 | 18 | 3.6 | 7.89 | 3.3 | 145 | 161 | 0.91 |
| 64 | 9 | 21 | 3.6 | 7.89 | 3.3 | 145 | 130 | 0.90 |
| 65 | 10 | 21 | 3.6 | 8.03 | 3.3 | 160 | 120 | 0.92 |

TABLE 4-continued

| EXAMPLE nr | Extrudate nr | SAN [wt %] | Longitudinal stretch | | Transversal stretch | | Thickness [μm] | Optical density after thermal fixation |
|---|---|---|---|---|---|---|---|---|
| | | | ratio | force* [N/mm²] | ratio | temperature [° C.] | | |
| 66 | 11 | 21 | 3.8 | 8.33 | 3.3 | 163 | 100 | 0.93 |
| 67 | 12 | 24 | 3.6 | 8.11 | 3.3 | 165 | 149 | 0.95 |

*the lower the stretch temperature the higher the stretching force

TABLE 5

| EXAMPLE nr | Extrudate nr | SAN [wt %] | BaSO₄ [wt %] | Longitudinal stretch | | Transversal stretch | | Thickness [μm] | Optical density after thermal fixation |
|---|---|---|---|---|---|---|---|---|---|
| | | | | ratio | force* [N/mm²] | ratio | temperature [° C.] | | |
| 68 | 12 | 20 | 1 | 3.6 | 9.21 | 3.3 | 166 | 100 | 1.02 |
| 69 | 13 | 17 | 2 | 3.8 | 8.0 | 3.3 | 140 | 90 | 0.92 |
| 70 | 14 | 19 | 2 | 3.6 | 8.0 | 3.3 | 160 | 130 | 1.06 |
| 71 | 2 | 19 | 2 | 3.6 | 8.33 | 3.3 | 164 | 100 | 0.98 |
| 72 | 15 | 19 | 2 | 3.6 | 8.0 | 3.3 | 145 | 105 | 1.00 |
| 73 | 16 | 19 | 2 | 3.8 | 8.0 | 3.3 | 170 | 100 | 1.10 |
| 74 | 17 | 19 | 2 | 3.8 | 8.0 | 3.3 | 170 | 95 | 1.09 |
| 75 | 18 | 19 | 2 | 3.8 | 8.0 | 3.3 | 170 | 125 | 1.22 |
| 76 | 19 | 19 | 2 | 3.8 | 8.0 | 3.3 | 125 | 75 | 1.02 |
| 77 | 20 | 19 | 2 | 3.85 | 8.0 | 3.3 | 125 | | 0.96 |
| 78 | 21 | 18 | 3 | 3.6 | 8.32 | 3.3 | 163 | 98 | 0.99 |

*the lower the stretch temperature the higher the stretching force

In films with a dispersion of styrene-acrylonitrile copolymer in a continuous phase of polyethylene terephthalate the opacity is almost exclusively due to micropores in the film, because the difference in refractive index between styrene-acrylonitrile copolymers with a refractive index of 1.56 to 1.57 and polyethylene terephthalate with a refractive index of 1.58 to 1.64 is negligible. Moreover, the incorporation of barium sulphate with a refractive index of 1.63 also provides a negligible contribution to the opacity for the same reasons. SEM-evaluation of the biaxially stretched and thermofixated film showed that the dispersed SAN 06 had a particle size of ca. 1.5 μm and that the barium sulphate particles in the films of INVENTION EXAMPLES 68 to 78 had a particle size of ca. 0.5 μm.

Up to a SAN-concentration of 21 wt % the optical density appears to increase with increasing SAN-concentration. Above a SAN-concentration of 21 wt %, the SAN-concentration had no significant effect on the optical density of the biaxially stretched film. Incorporation of barium sulphate brought about a further significant increase in the optical density of the films produced.

The changes in optical density and shrinkage of the films of INVENTION EXAMPLES 65, 67, 68 and 70 after 30 minutes at 100, 115 and 130° C. were then determined and the results are given in Tables 6 and 7 respectively below.

The results in Tables 6 and 7 demonstrate the stability of the non-transparent microvoided axially stretched self-supporting films comprising ≦3% by weight of inorganic opacifying pigment each with a refractive index of less than 2.0 subjected to the image-wise heating process of the present invention to provide a transparent pattern, according to the present invention.

TABLE 6

| EXAMPLE nr | BaSO₄ [wt %] | ΔOD after 2 min at 150° C. thermal fixation | Subsequent to thermal fixation | | |
|---|---|---|---|---|---|
| | | | ΔOD after 30 min at 100° C. | ΔOD after 30 min at 115° C. | ΔOD after 30 min at 130° C. |
| 66 | 0 | −0.01 | −0.03 | −0.02 | −0.01 |
| 68 | 1 | −0.04 | −0.07 | −0.08 | −0.09 |
| 71 | 2 | 0.00 | −0.03 | −0.04 | −0.07 |
| 78 | 3 | −0.01 | −0.05 | −0.07 | −0.09 |

TABLE 7

| EXAMPLE nr | BaSO₄ [wt %] | After 2 min at 150° C. thermal fixation | | |
|---|---|---|---|---|
| | | % Shrinkage after 30 min at 100° C. | % Shrinkage after 30 min at 115° C. | % Shrinkage after 30 min at 130° C. |
| 66 | 0 | 1.7 | 4.2 | 6.4 |
| 68 | 1 | 2.0 | 4.7 | 6.9 |
| 71 | 2 | 1.6 | 3.9 | 5.9 |
| 78 | 3 | 1.7 | 4.3 | 6.1 |

Invention Example 79

The film of INVENTION EXAMPLE 72 was mounted in an Instron 4411 apparatus and was heated at temperatures between 138 and 200° C. for 5 seconds with a soldering iron in the upper clamp making contact with the film at a pressure of 0.5 N/mm². The optical densities of the film after the test were measured in transmission with a MacBeth TR924 densitometer with a visible filter. The results are summarized in Table 8 below.

TABLE 8

| Temperature [° C.] | Optical density, OD | ΔOD | % reduction in OD |
|---|---|---|---|
| before heating | 1.12 | | |
| 138 | 1.00 | 0.12 | 10.7 |
| 150 | 0.91 | 0.31 | 27.7 |
| 175 | 0.61 | 0.51 | 45.5 |
| 200 | 0.42 | 0.70 | 62.5 |

In other experiments the thermofixated stretched film was heated at a temperature of 175° C. for 5 seconds at different pressures between 0.1 N/mm$^2$ to 1.50 N/mm$^2$ in the Instron apparatus with the results shown in Table 9 below.

TABLE 9

| Pressure [N/mm$^2$] | Optical density | ΔOD | % reduction in OD |
|---|---|---|---|
| before heating | 1.12 | | |
| 0.01 | 1.06 | 0.06 | 5.4 |
| 0.10 | 0.92 | 0.20 | 17.9 |
| 0.50 | 0.61 | 0.51 | 45.5 |
| 1.00 | 0.51 | 0.61 | 54.5 |
| 1.50 | 0.40 | 0.72 | 64.3 |

In further experiments the thermofixated stretched film was heated at a temperature of 175° C. and a pressure of 0.5 N/mm$^2$ in the Instron apparatus for different times between 2 and 300 seconds with the results shown in Table 10 below.

TABLE 10

| Heating time [s] | Optical density | ΔOD | % reduction in OD |
|---|---|---|---|
| before heating | 1.12 | | |
| 2 | 0.68 | 0.44 | 39.3 |
| 5 | 0.61 | 0.51 | 45.5 |
| 10 | 0.56 | 0.56 | 50 |
| 30 | 0.51 | 0.61 | 54.5 |
| 60 | 0.45 | 0.67 | 59.8 |
| 300 | 0.41 | 0.71 | 63.4 |

These experiments demonstrate that the transparentization effect is due to a combination of the temperature of the transparentization entity and the pressure with which it is applied and time for which it is applied. Considerable changes in optical density can be realized at accessible temperatures and pressures in relatively short times.

Invention Example 80

Transparentization tests were carried out on the film of INVENTION EXAMPLE 66 as described in INVENTION EXAMPLE 79. The temperature was varied with a contact pressure of 0.5 N/mm$^2$ and a contact time of 5 seconds as described for INVENTION EXAMPLE 79 with the results given in Table 11.

TABLE 11

| Temperature [° C.] | Optical density, OD | ΔOD | % reduction in OD |
|---|---|---|---|
| before heating | 0.93 | | |
| 138 | 0.75 | 0.18 | 19.4 |
| 150 | 0.73 | 0.20 | 21.5 |
| 175 | 0.52 | 0.41 | 44.1 |
| 200 | 0.31 | 0.62 | 66.7 |

These experiments show that the presence of barium sulphate is not necessary to realize transparentization.

Invention Example 81

A 8 inch (203.2 mm) by 10 inch (254 mm) piece of the film of INVENTION EXAMPLE 65 (120 μm thick and with an optical density of 0.92) was fed into a standard DRYSTAR DS5500 printer from AGFA-GEVAERT N.V. with a Toshiba thermal head and a rectangular area printed at a line time of 4.3 ms with the maximum power of 49.5 mW. The printed area had an optical density of 0.80 as measured with a MacBeth TR924 densitometer with a visual filter. The low reduction in optical density is probably due to a too low pressure between the sheet and the thermal head due to the DS5500 printer being designed for film ca. 200 μm thick with a 175 μm thick support rather than the 100 μm thick film used in the experiment.

This experiment was then repeated with a second piece of this film 8 inch (203.2 mm) by 10 inch (254 mm) in size mounted with double-sided tape on a sheet of DS2 thermographic film from AGFA-GEVAERT and again fed into the DRYSTAR DS 5500 printer using the same print conditions except that the maximum power was 42.5 mW rather than 49.5 mW. The printed area had an optical density of 0.64 as measured with a MacBeth TR924 densitometer with a visual filter. The change in optical density of 0.28 observed is sufficient to demonstrate that conventional thermal head printers can be used to provide a transparent pattern in non-transparent microvoided axially stretched self-supporting films comprising ≦3% by weight of inorganic opacifying pigment each with a refractive index of less than 2.0, according to the present invention. These transparency changes were associated with a pronounced relief pattern, which was clearly detectable by touch.

Invention Example 82

Transparentization tests were carried out on the film of INVENTION EXAMPLE 77 as described in INVENTION EXAMPLE 79. The transparentization was determined at various temperatures between 120 and 190° C. at a contact pressure of 0.5 N/mm$^2$ and a contact time of 5 seconds as described for INVENTION EXAMPLE 79 with the results given in Table 12.

TABLE 12

| Temperature [° C.] | Optical density, OD | ΔOD | % reduction in OD | Film thickness [μm] |
|---|---|---|---|---|
| before heating | 0.96 | | | 73 |
| 120 | 0.67 | 0.29 | 30.2 | 73 |
| 130 | 0.57 | 0.39 | 40.6 | 72 |
| 150 | 0.57 | 0.39 | 40.6 | 72 |
| 170 | 0.34 | 0.62 | 64.6 | 69 |
| 190 | 0.29 | 0.67 | 69.8 | 66 |

Invention Examples 83 to 87 and Comparative Examples 1 to 3

Biaxial Stretching

The PET-types and SAN-types used for producing the extrudates used in producing of the films of EXAMPLES 83 to 87 and COMPARATIVE EXAMPLES 1 to 3 are given in Table 16. The PET, SAN, TiO$_2$ and UVITEX OB-one in the weight percentages given in Table 13 were mixed and then dried at 150° C. for 4 hours under vacuum (<100 mbar), the mixtures then melted in a PET-extruder and extruded through a sheet die and cooled to produce INVENTION EXTRUDATES 22 to 26 and COMPARATIVE EXTRUDATES 1 to 3.

TABLE 13

|  | PET01 [wt %] | PET02 [wt %] | PET03 [wt %] | SAN type | SAN [wt %] | TiO$_2$ [wt %] | OB-one [ppm] | PET/SAN wt ratio |
|---|---|---|---|---|---|---|---|---|
| Invention Extrudate nr | | | | | | | | |
| 22 | 39.5 | 39.5 | — | 06 | 19 | 2 | — | 4.16 |
| 23 | 39.5 | 39.5 | — | 06 | 19 | 2 | 150 | 4.16 |
| 24 | 39.5 | — | 39.5 | 06 | 19 | 2 | — | 4.16 |
| 25 | 39.5 | 39.5 | — | 06 | 19 | 2 | — | 4.16 |
| 26 | 39 | 39 | — | 06 | 18 | 4 | — | 4.33 |
| Comparative Extrudate nr | | | | | | | | |
| 1 | 98 | — | — | — | — | 2 | 150 | — |
| 2 | 47 | — | 47 | — | — | 6 | — | — |
| 3 | 44 | — | 44 | — | — | 12 | — | — |

INVENTION EXTRUDATES 22 to 26 and COMPARATIVE EXTRUDATES 1 to 3 were then stretched and finally thermally fixated at 175° C. for 1 minute as given in Tables 14 and 15 for the substantially opaque films of INVENTION EXAMPLES 86 to 90 and those of COMPARATIVE EXAMPLES 1 to 3 respectively.

The optical densities of the films of INVENTION EXAMPLES 83 to 87 and the films of COMPARATIVE EXAMPLES 1 to 3 were measured in transmission with a MACBETH TR924 densitometer with a visible filter and the results given in Tables 14 and 15 for the films of INVENTION EXAMPLES 86 to 90 and those of COMPARATIVE EXAMPLES 1 to 3 respectively.

TABLE 14

|  | Invention Example nr | | | | |
|---|---|---|---|---|---|
|  | 83 | 84 | 85 | 86 | 87 |
|  | Invention Extrudate nr | | | | |
|  | 23 | 24 | 25 | 26 | 27 |
| SAN [wt %] | 19 | 19 | 19 | 19 | 17 |
| Titanium dioxide [wt %] | 2.0 | 2.0 | 2.0 | 2.0 | 4.0 |
| Longitudinal stretch ratio | 3.6 | 3.3 | 3.8 | 3.8 | 3.8 |
| Longitudinal stretch tension* [N/mm$^2$] | 8.0 | 6.0 | 8.5 | 8.35 | 8.0 |
| Transversal stretch ratio | 3.8 | 3.3 | 3.3 | 3.3 | 3.3 |
| Transversal stretch temperature [° C.] | 125 | 135 | 135 | 135 | 125 |
| Thickness [μm] | 120 |  | 106 | 102 |  |
| Optical density after thermal fixation | 1.24 | 1.15 | 1.17 | 1.19 | 1.41 |

*the higher the stretching tension the lower the stretch temperature

TABLE 15

|  | Comparative Example nr | | |
|---|---|---|---|
|  | 1 | 2 | 3 |
|  | Comparative Extrudate nr | | |
|  | 1 | 2 | 3 |
| Titanium dioxide [wt %] | 2.0 | 6.0 | 12.0 |
| Longitudinal stretch ratio | 3.3 | 3.3 | 3.3 |
| Longitudinal stretch tension* [N/mm$^2$] | 6.0 | 5.0 | 5.0 |
| Transversal stretch ratio | 3.3 | 3.3 | 3.3 |
| Transversal stretch temperature [° C.] | 135 | 135 | 135 |
| Thickness [μm] |  | 140 | 135 |
| Optical density after thermal fixation | 0.45 | 0.90 | 1.12 |

*the higher the stretching tension the lower the stretch temperature

The contribution to the substantial opacity of the films of INVENTION EXAMPLES 83 to 87 from the dispersion of styrene-acrylonitrile copolymer in a continuous phase of polyethylene terephthalate is almost exclusively due to micropores in the film, because the difference in refractive index between styrene-acrylonitrile copolymers with a refractive index of 1.56 to 1.57 and polyethylene terephthalate with a refractive index of 1.58 to 1.64 is negligible. However, the contribution to the substantial opacity of the films of INVENTION EXAMPLES 83 to 87 from the dispersion of titanium dioxide in a continuous phase of polyethylene terephthalate is almost exclusively due to the refractive index difference between titanium dioxide with a refractive index of 2.76 and that of polyethylene terephthalate with a refractive index of 1.58 to 1.64.

SEM-evaluation of the biaxially stretched and thermofixated film showed that the dispersed SAN 06 in the films of INVENTION EXAMPLES 83 to 87 had a particle size of ca. 1.5 μm and that the titanium dioxide particles in the films of INVENTION EXAMPLES 83 to 87 had a particle size of ca. 0.2 μm.

The films of INVENTION EXAMPLES 84, 85 and 87 and COMPARATIVE EXAMPLES 1 to 3 were each mounted in an Instron 4411 apparatus and were heated at various temperatures between 120 and 190° C. for 5 seconds with a soldering iron in the upper clamp making contact with the film at a pressure of 0.5 N/mm². The optical densities of the film after the tests were measured in transmission with a MacBeth TR924 densitometer with a visible filter and the film thicknesses were also measured. The results are summarized below in Tables 16 and 17 respectively.

TABLE 16

| | OD before heating | OD after heating for 5 s at a pressure of 0.5 N/mm² at | | | | | ΔOD at | % reduction |
|---|---|---|---|---|---|---|---|---|
| | | 120° C. | 130° C. | 150° C. | 170° C. | 190° C. | 150° C. | in OD |
| Film of Invention Example nr | | | | | | | | |
| 84 | 1.15 | 0.92 | 0.84 | 0.85 | 0.60 | 0.61 | 0.30 | 26.1 |
| 85 | 1.15 | 0.94 | 0.78 | 0.75 | 0.59 | 0.53 | 0.40 | 34.8 |
| 87 | 1.41 | 1.26 | 1.16 | 1.13 | 0.99 | 0.92 | 0.28 | 19.9 |
| Film of Comparative Example nr | | | | | | | | |
| 1 | 0.45 | 0.47 | 0.46 | 0.46 | 0.47 | 0.45 | −0.01 | −0.01 |
| 2 | 0.90 | 0.90 | 0.91 | 0.89 | 0.88 | 0.85 | 0.01 | 0.01 |
| 3 | 1.12 | 1.14 | 1.14 | 1.11 | 1.11 | 1.08 | 0.01 | 0.01 |

TABLE 17

| | Film thickness before heating | Film thickness after heating for 5 s at a pressure of 0.5 N/mm² at | | | | |
|---|---|---|---|---|---|---|
| | | 120° C. | 130° C. | 150° C. | 170° C. | 190° C. |
| Film of Invention Example nr | | | | | | |
| 84 | 102 | 103 | 102 | 98 | 89 | 98 |
| 85 | 116 | 113 | 109 | 111 | 100 | 94 |
| 87 | 105 | 102 | 102 | 99 | 92 | 89 |
| Film of Comparative Example nr | | | | | | |
| 1 | 93 | 92 | 91 | 93 | 92 | 85 |
| 2 | 138 | 139 | 142 | 137 | 132 | 115 |
| 3 | 137 | 136 | 135 | 139 | 131 | 119 |

Significant transparentization was observed upon heating the films of INVENTION EXAMPLES 84, 85 and 87 without substantial change in film thickness, whereas within experimental error no transparentization was observed upon heating the films of COMPARATIVE EXAMPLES 1 to 3.

This shows in the presence of titanium dioxide transparentization is observed in non-transparent microvoided axially stretched self-supporting film comprising a polymer as a continuous phase and dispersed uniformly therein an amorphous high polymer with a higher glass transition temperature than the glass transition temperature of said continuous phase, although there is no transparentization of the contribution to the non-transparency due to the presence of titanium dioxide.

Comparative Example 4

The ca. 1100 μm thick extrudate of COMPARATIVE EXAMPLE 4 with a composition of 1.7% by weight of titanium dioxide and 98.3% by weight of GP1 was produced as described for EXAMPLES 1 to 58 and was stretched in the length direction as described in EXAMPLES 1 to 58 under the conditions given in Table 18.

TABLE 18

| Comparative Example nr | Stretch ratio | Stretch force [N/mm2] | Thickness [μm] | OD (TR924) | OD [X-rite] |
|---|---|---|---|---|---|
| 4/LS1 | 3.35 | 9 | 330 | 1.14 | 0.87 |
| 4/LS2 | 3.35 | 7 | | 1.04 | 0.81 |
| 4/LS3 | 3.35 | 5 | | 1.02 | 0.78 |

Transversal stretching was then performed as described in EXAMPLES 59 to 78 on the length-stretched films with a stretch time of 30 s and stretching speed of 1000%/min under the conditions given in Table 19. The measured thickness and optical density measured with a MacBeth TR924 densitometer in transmission mode with a visible filter are also given in Table 19.

TABLE 19

| Comparative Example nr. | Stretch ratio | Stretch temperature [° C.] | Thickness [μm] | OD (TR924) | OD [X-rite] |
|---|---|---|---|---|---|
| 4/LS1/BS1 | 3.3 | 135 | 137 | 1.34, 1.33 | 1.05 |
| 4/LS2/BS1 | 3.3 | 135 | 140, 137 | 0.53 | 0.99 |

The film of COMPARATIVE EXAMPLE 4/LS1/BS1 was then clamped in an Instron 4411 apparatus and subjected to heating with a soldering iron at 150° C. for 5 s. The effect upon the film thickness and optical density is given in Table 20.

TABLE 20

|  | OD (TR924) | Film thickness [μm] |
|---|---|---|
| before heating | 1.33 | 137 |
| after heating at 150° C. for 5 s | 1.25 | 130 |

These changes in optical density and film thickness are minimal and demonstrate that no void-forming occurs in polyester compositions containing 2% by weight of titanium dioxide.

Comparative Example 5

The 1083 μm thick extrudate of COMPARATIVE EXAMPLE 5 with a composition of 2% by weight of titanium dioxide, 100 ppm UVITEX OB-one and 98% by weight of PET02 was produced as described for EXAMPLES 1 to 58 and had an optical density measured with a MacBeth TR924 densitometer in transmission mode with a visible filter of 1.35. The extrudate was stretched in the length direction as described in EXAMPLES 1 to 58 under the conditions given in Table 20.

TABLE 20

| Comparative Example nr. | Stretch ratio | Stretch force [N/mm²] | Thickness [μm] | OD (TR924) | OD [X-rite] |
|---|---|---|---|---|---|
| 5/LS1 | 3.3 | 6 | 323 | 0.805 | 0.55 |
| 5/LS2 | 3.3 | 4 | 328 | 0.84 | — |

Transversal stretching was then performed on the length-stretched films with a stretch time of 30 s and stretching speed of 1000%/min as described in EXAMPLES 59 to 78 under the conditions given in Table 21. The measured thickness and measured optical density with the MacBeth TR924 densitometer in transmission mode with a visible filter are also given in Table 21.

TABLE 21

| Comparative Example nr. | Stretch ratio | Stretch temperature [° C.] | Thickness [μm] | OD (TR924) | OD [X-rite] |
|---|---|---|---|---|---|
| 5/LS1/BS1 | 3.3 | 135 | 120 | 0.47 | 0.30 |
| 5/LS2/BS1 | 3.3 | 135 | 124 | 0.53 | 0.33 |

Since there is no contribution to the optical density from void-forming upon biaxial stretching for the composition of COMPARATIVE EXAMPLE 5 as can be seen from COMPARATIVE EXAMPLE 1 to 4, the dependence of optical density upon film thickness can be used to provide a baseline with which to assess the contribution of void-forming to the optical density for those compositions based upon aromatic polyesters with 2% by weight of the same titanium dioxide pigment which form voids upon biaxial stretching.

The Beer-Lambert relationship does not hold for pigmented films with light-scattering pigments such as titanium dioxide. If the film thickness is smaller than the average free path-length of the scattered light, light will escape after scattering otherwise the light does not escape and in fact interferes with further scattered light providing for a quasi-exponential dependence of optical density upon film thickness. The situation is too complex to be able to be described theoretically and hence the only possible approach is to measure the actual optical density observed at particular film thicknesses. The above-mentioned optical density appear to a fair approximation to bee linearly dependent upon the logarithm of the film thickness in the layer thickness range 1084 to 120 μm giving the following relationship:

$$OD\ 0.891\ \log\ [\text{thickness in μm}] - 1.3727$$

This relationship provides the optical density attributable to a 2% by weight concentration of the titanium dioxide pigment used as a function of film thickness.

Invention Examples 88 to 105

The ca. 1100 μm thick extrudates of EXAMPLES 88 to 105 all with 2% by weight of titanium dioxide and 15% by weight of SAN 06 were produced by mixing the ingredients in Table 22 in the proportions given in Table 22 and then drying the mixture at 150° C. for 4 hours under vacuum (<100 mbar) before melting in a PET-extruder, extrusion through a sheet die and cooling to produce the extrudates of EXAMPLES 88 to 108 having a density of ca. 1.3 g/mL as summarized in Table 22 together with the isophthalate (IPA):terephthalate (TPA) ratio.

TABLE 22

| Invention example nr. | PET02 [wt %] | PET04 [wt %] | PET05 [wt %] | IPA:TPA ratio | SAN type | SAN [wt %] | UVITEX OB-one [ppm] | TiO₂ [wt %] | Density [g/mL] |
|---|---|---|---|---|---|---|---|---|---|
| 88 | 83 | 0 | — | 0 | 06 | 15 | — | 2.0 | 1.294 |
| 89 | 58 | 25 | — | 0.0310 | 06 | 15 | — | 2.0 | 1.289 |
| 90 | 41.5 | 41.5 | — | 0.0526 | 06 | 15 | 100 | 2.0 | 1.284 |
| 91 | 33.35 | 49.7 | — | 0.0636 | 06 | 15 | — | 1.95 | |
| 92 | 33.3 | 49.7 | — | 0.0637 | 06 | 15 | 100 | 2.0 | |
| 93 | 32.3 | 50.7 | — | 0.0650 | 06 | 15 | 100 | 2.0 | |
| 94 | 32.3 | 50.7 | — | 0.0650 | 06 | 15 | 100 | 2.0 | |
| 95 | 26.29 | 56.71 | — | 0.0733 | 06 | 15 | 100 | 2.0 | |
| 96 | 25.25 | 57.75 | — | 0.0748 | 06 | 15 | 100 | 2.0 | |
| 97 | 25 | 58 | — | 0.0751 | 06 | 15 | 100 | 2.0 | 1.304 |
| 98 | 24.3 | 58.7 | — | 0.0761 | 06 | 15 | 100 | 2.0 | |
| 99 | 1.05 | 82.0 | — | 0.109 | 06 | 15 | — | 1.95 | |
| 100 | — | 83 | — | 0.111 | 06 | 15 | — | 2.0 | 1.299 |
| 101 | — | 83 | — | 0.111 | 06 | 15 | 100 | 2.0 | |
| 102 | 28.25 | 22.3 | 32.5 | 0.168 | 06 | 15 | 100 | 1.95 | |
| 103 | 14.85 | 22.3 | 45.9 | 0.239 | 06 | 15 | — | 1.95 | |
| 104 | 1.05 | 22.3 | 59.7 | 0.320 | 06 | 15 | — | 1.95 | |
| 105 | 1.05 | — | 82.0 | 0.421 | 06 | 15 | — | 1.95 | |

Longitudinal stretching was carried out for each extrudate as described in EXAMPLES 1 to 58 under the conditions given in Table 23. The expected thickness is the thickness based on the extrudate thickness and longitudinal as observed for non-voided films.

Longitudinal stretching was accompanied by a decrease in density due to void-forming, this decrease in density clearly increasing as the IPA:TPA ratio increases, surprisingly indicates that an increase in the IPA:TPA ratio favours increased void-forming in the film.

TABLE 23

| Invention example nr | IPA:TPA ratio | temperature [° C.] | ratio | V1 speed [m/min] | force [N/mm²] | Density [g/mL] | Thickness [µm] | Expected thickness [µm] |
|---|---|---|---|---|---|---|---|---|
| 88/LS1 | 0 | | 3.85 | 4.0 | 8 | 1.290 | 320 | 286 |
| 89/LS1 | 0.0310 | | 3.85 | 4.0 | 8 | 1.264 | 325 | 286 |
| 89/LS2 | 0.0310 | | 3.65 | 4.0 | 8 | | 323 | 301 |
| 90/LS1 | 0.0526 | | 3.85 | 4.0 | 8 | 1.251 | 318 | 286 |
| 91/LS1 | 0.0636 | 92 | 3.3 | 4.0 | 8.0 | | 380 | 333 |
| 91/LS2 | 0.0636 | 80 | 3.3 | 4.0 | 9.0-9.5 | | 380 | 333 |
| 91/LS3 | 0.0636 | 108 | 3.3 | 4.0 | 7.5 | | 375 | 333 |
| 92/LS1 | 0.0637 | 101 | 3.3 | 4.0 | 8 | 1.216 | 350 | 333 |
| 92/LS2 | 0.0637 | 116 | 3.3 | 4.0 | 8 | 1.283 | 330 | 333 |
| 96/LS1 | 0.0650 | | 3.3 | 4.0 | 8.6 | | 365 | 333 |
| 94/LS1 | 0.0650 | 120 | 3.8 | 4.0 | 8 | | 300 | 290 |
| 94/LS2 | 0.0650 | 96 | 3.6 | 4.0 | 8 | | 335 | 305 |
| 94/LS3 | 0.0650 | 85 | 3.45 | 4.0 | 8 | | 350 | 319 |
| 95/LS1 | 0.0733 | 92 | 3.3 | 4.0 | 8 | 1.229 | 360 | 333 |
| 96/LS1 | 0.0748 | 95 | 3.3 | 4.0 | 8 | 1.242 | 330 | 333 |
| 97/LS1 | 0.0751 | | 3.85 | 4.0 | 8 | 1.217 | 330 | 286 |
| 98/LS1 | 0.0761 | 94 | 3.3 | 4.0 | 8 | 1.216 | 350 | 333 |
| 98/LS2 | 0.0761 | 110 | 3.3 | 4.0 | 7 | 1.258 | 333 | 333 |
| 99/LS1 | 0.109 | 96 | 3.3 | 4.0 | 8.0 | | 370 | 333 |
| 99/LS2 | 0.109 | 84 | 3.3 | 4.0 | 9.0-9.5 | | 385 | 333 |
| 100/LS1 | 0.111 | | 3.85 | 4.0 | 8 | 1.125 | 345 | 286 |
| 100/LS2 | 0.111 | | 3.65 | 4.0 | 8 | | 380 | 301 |
| 101/LS1 | 0.111 | | 3.85 | 4.0 | 8 | | 320 | 286 |
| 101/LS2 | 0.111 | | 3.85 | 4.0 | 5 | | | 286 |
| 101/LS3 | 0.111 | | 3.85 | 4.0 | 6 | | | 286 |
| 102/LS1 | 0.168 | 85 | 3.3 | 4.0 | 8.2 | | 393 | 333 |
| 103/LS1 | 0.239 | 86 | 3.3 | 4.0 | 6.0 | | 390 | 333 |
| 104/LS1 | 0.320 | 79 | 3.3 | 4.0 | 8.0 | | 392 | 327 |
| 104/LS2 | 0.321 | 85 | 3.3 | 4.0 | 7.0 | | 400 | 327 |
| 105/LS1 | 0.421 | 82 | 3.3 | 4.0 | 6.0 | | 375 | 333 |
| 105/LS2 | 0.421 | 87 | 3.3 | 4.0 | 5.0 | | 380 | 333 |

Table 24 gives the measured thickness; the expected thickness i.e. thickness if no void-forming based on the extrudate thickness, the longitudinal stretch ratio and the transversal stretch ratio; the measured optical density with the MacBeth TR924 densitometer in transmission mode with a visible filter, the expected optical density, i.e. the optical density calculated using the relationship disclosed in COMPARATIVE EXAMPLE 5 using the theoretical layer thickness values, and the difference between the observed optical density and the optical density expected due to a 2% by weight concentration of the particular titanium dioxide pigment used, ΔOD.

TABLE 24

| Invention example nr. | IPA:TPA ratio | Thickness [µm] | V1 speed [m/min] | Expected thickness [µm] | OD TR924 | Expected OD | ΔOD | ΔOD/ OD | OD [X-rite] |
|---|---|---|---|---|---|---|---|---|---|
| 88/LS1 | 0 | 320 | 4.0 | 286 | 1.00 | 0.81 | 0.19 | 0.19 | 0.76 |
| 89/LS1 | 0.0310 | 325 | 4.0 | 286 | 1.05 | 0.81 | 0.24 | 0.23 | 0.82 |
| 89/LS2 | 0.0310 | 323 | 4.0 | 301 | 1.00 | 0.83 | 0.17 | 0.17 | 0.78 |
| 90/LS1 | 0.0526 | 318 | 4.0 | 286 | 1.06 | 0.81 | 0.25 | 0.23 | 0.85 |
| 91/LS1 | 0.0636 | 380 | 4.0 | 333 | 1.17 | 0.87 | 0.30 | 0.26 | 0.96 |
| 91/LS2 | 0.0636 | 380 | 4.0 | 333 | 1.15 | 0.87 | 0.28 | 0.24 | 0.97 |
| 91/LS3 | 0.0636 | 375 | 8.0 | 333 | 1.12 | 0.87 | 0.25 | 0.22 | 0.92 |
| 92/LS1 | 0.0637 | 350 | 4.0 | 333 | 1.21 | 0.87 | 0.34 | 0.28 | 0.98 |
| 92/LS2 | 0.0637 | 330 | 4.0 | 333 | 1.02 | 0.87 | 0.15 | 0.15 | 0.80 |
| 96/LS1 | 0.0650 | 365 | 4.0 | 333 | | 0.87 | | | |
| 94/LS1 | 0.0650 | 300 | 4.0 | 290 | | | | | |
| 94/LS2 | 0.0650 | 335 | 4.0 | 305 | | | | | |

TABLE 24-continued

| Invention example nr. | IPA:TPA ratio | Thickness [μm] | V1 speed [m/min] | Expected thickness [μm] | OD TR924 | Expected OD | ΔOD | ΔOD/OD | OD [X-rite] |
|---|---|---|---|---|---|---|---|---|---|
| 94/LS3 | 0.0650 | 350 | 4.0 | 319 | | | | | |
| 95/LS1 | 0.0733 | 360 | 4.0 | 333 | 1.17 | 0.87 | 0.30 | 0.26 | 0.97 |
| 96/LS1 | 0.0748 | 330 | 4.0 | 333 | 1.08 | 0.87 | 0.21 | 0.19 | 0.90 |
| 97/LS1 | 0.0751 | 330 | 4.0 | 286 | 1.13 | 0.81 | 0.32 | 0.28 | 0.92 |
| 98/LS1 | 0.0761 | 350 | 4.0 | 333 | 1.18 | 0.87 | 0.31 | 0.26 | 1.00 |
| 98/LS2 | 0.0761 | 333 | 4.0 | 333 | 1.10 | 0.87 | 0.23 | 0.21 | 0.89 |
| 99/LS1 | 0.109 | 370 | 4.0 | 333 | 1.15 | 0.87 | 0.28 | 0.24 | 0.93 |
| 99/LS2 | 0.109 | 385 | 4.0 | 333 | 1.28 | 0.87 | 0.41 | 0.32 | 1.01 |
| 100/LS1 | 0.1111 | 345 | 4.0 | 286 | 1.20 | 0.81 | 0.39 | 0.32 | 1.02 |
| 100/LS2 | 0.1111 | 380 | 4.0 | 301 | 1.23 | 0.83 | 0.40 | 0.32 | 1.00 |
| 101/LS1 | 0.1111 | 320 | 4.0 | 286 | 1.24 | 0.81 | 0.43 | 0.35 | 1.00 |
| 101/LS2 | 0.1111 | | 4.0 | 286 | 1.02 | 0.81 | 0.21 | 0.20 | 0.83 |
| 101/LS3 | 0.1111 | | 4.0 | 286 | 1.10 | 0.81 | 0.29 | 0.26 | 0.83 |
| 102/LS1 | 0.168 | 393 | 4.0 | 333 | 1.15 | 0.87 | 0.28 | 0.24 | 0.97 |
| 103/LS1 | 0.239 | 390 | 4.0 | 333 | 1.12 | 0.87 | 0.25 | 0.22 | 0.91 |
| 104/LS1 | 0.320 | 392 | 4.0 | 327 | 1.37 | 0.87 | 0.50 | 0.36 | 1.10 |
| 104/LS2 | 0.320 | 400 | 4.0 | 327 | 1.10 | 0.87 | 0.23 | 0.21 | 0.89 |
| 105/LS1 | 0.421 | 375 | 4.0 | 333 | 1.13 | 0.87 | 0.26 | 0.23 | 0.76 |
| 105/LS2 | 0.421 | 380 | 4.0 | 333 | 0.97 | 0.87 | 0.10 | 0.10 | 0.89 |

Longitudinal stretching was accompanied by a decrease in density due to void-forming, this decrease in density clearly increasing as the proportion of PET04 increased i.e. surprisingly indicates that an increase in the isophthalic acid unit concentration in the aromatic polyester favours increased void-forming in the film. The increase in optical density due to void forming was in the range of 17 to 36%.

Transversal stretching was then performed on the longitudinally stretched films with a stretch time of 30 s and stretching speed of 1000%/min under the conditions given in Table 25. The density, measured thickness and the expected thickness, i.e. thickness if no void-forming based on the extrudate thickness, the longitudinal stretch ratio and the transversal stretch ratio, are also given in Table 25.

TABLE 25

| Invention example nr | IPA:TPA ratio | Transversal stretch temperature [° C.] | ratio | speed [%/min] | Density [g/mL] | Thickness [μm] | Expected thickness [μm] |
|---|---|---|---|---|---|---|---|
| 88/LS1/BS1 | 0 | 135 | 3.3 | 1000 | 1.284 | 101 | 87 |
| 89/LS1/BS1 | 0.031 | 134 | 3.3 | 1000 | 1.219 | 95 | 87 |
| 89/LS2/BS1 | 0.031 | 135 | 3.3 | 1000 | | 102 | 91 |
| 90/LS1/BS1 | 0.0526 | 132 | 3.3 | 1000 | | 100 | 87 |
| 90/LS1/BS2 | 0.0526 | | | 1000 | 1.234 | 97 | 87 |
| 91/LS1/BS1 | 0.0636 | 100 | 3.5 | 1000 | | 145 | 95 |
| 91/LS2/BS1 | 0.0636 | 105 | 3.5 | 1000 | | 150 | 95 |
| 91/LS3/BS1 | 0.0636 | 95 | 3.5 | 1000 | | 126 | 95 |
| 92/LS1/BS1 | 0.0637 | 100 | 3.5 | 1000 | 1.074 | 140 | 95 |
| 92/LS1/BS2 | 0.0637 | 96 | 3.5 | 1000 | 1.002 | 135 | 95 |
| 92/LS2/BS1 | 0.0637 | 96 | 3.5 | 1000 | 1.158 | 116 | 95 |
| 93/LS1/BS1 | 0.0650 | 132 | 3.3 | 1000 | 1.228 | 140 | 101 |
| 94/LS1/BS1 | 0.0650 | 122 | 3.3 | 1000 | | 110 | 88 |
| 94/LS2/BS1 | 0.0650 | 122 | 3.3 | 1000 | | 135 | 93 |
| 94/LS3/BS1 | 0.0650 | 122 | 3.3 | 1000 | | 150 | 97 |
| 95/LS1/BS1 | 0.0733 | 95 | 3.5 | 1000 | 1.071 | 145 | 95 |
| 96/LS1/BS1 | 0.0748 | 96 | 3.5 | 1000 | 1.070 | 138 | 95 |
| 97/LS1/BS1 | 0.0751 | 134 | 3.3 | 1000 | 1.195 | 105 | 87 |
| 98/LS1/BS1 | 0.0761 | 95 | 3.5 | 1000 | 1.055 | 147 | 95 |
| 98/LS2/BS1 | 0.0761 | 95 | 3.5 | 1000 | 1.140 | 112 | 95 |
| 99/LS1/BS1 | 0.109 | 92 | 3.5 | 1000 | | 207 | 95 |
| 99/LS1/BS2 | 0.109 | 85 | 3.5 | 1000 | | 199 | 95 |
| 99/LS1/BS3 | 0.109 | 83 | 3.5 | 1000 | | 198 | 95 |
| 99/LS2/BS1 | 0.109 | 92 | 3.5 | 1000 | | 205 | 95 |
| 99/LS2/BS2 | 0.109 | 85 | 3.5 | 1000 | | 210 | 95 |
| 99/LS2/BS3 | 0.109 | 81 | 3.5 | 1000 | | 214 | 95 |
| 100/LS1/BS1 | 0.1111 | 135 | 3.3 | 1000 | 0.990 | 169 | 87 |
| 100/LS2/BS1 | 0.1111 | 135 | 3.3 | 1000 | | 185 | 91 |
| | | | | | | 156 | |
| 101/LS1/BS1 | 0.1111 | 110 | 3.3 | 1000 | 1.121 | 130 | 86 |
| 101/LS2/BS1 | 0.1111 | 110 | 3.3 | 1000 | | 125 | 86 |
| 101/LS3/BS1 | 0.1111 | 110 | 3.3 | 1000 | | 120 | 86 |
| 102/LS1/BS1 | 0.168 | 89 | 3.5 | 1000 | | 198 | 95 |
| 102/LS1/BS2 | 0.168 | 84 | 3.5 | 1000 | | 201 | 95 |
| 102/LS1/BS3 | 0.168 | 78 | 3.5 | 1000 | | 204 | 95 |
| 103/LS1/BS1 | 0.239 | 89 | 3.5 | 1000 | | 191 | 95 |
| 103/LS1/BS2 | 0.239 | 84 | 3.5 | 1000 | | 186 | 95 |

TABLE 25-continued

| Invention example nr | IPA:TPA ratio | Transversal stretch temperature [° C.] | ratio | speed [%/min] | Density [g/mL] | Thickness [μm] | Expected thickness [μm] |
|---|---|---|---|---|---|---|---|
| 104/LS1/BS1 | 0.320 | 92 | 3.5 | 1000 | | 211 | 95 |
| 104/LS1/BS2 | 0.320 | 86 | 3.5 | 1000 | | 210 | 95 |
| 104/LS2/BS1 | 0.320 | 92 | 3.5 | 1000 | | 190 | 95 |
| 104/LS2/BS2 | 0.320 | 86 | 3.5 | 1000 | | 200 | 95 |
| 105/LS1/BS1 | 0.421 | 92 | 3.5 | 1000 | | 190 | 95 |
| 105/LS1/BS2 | 0.421 | 90 | 3.5 | 1000 | | 170 | 95 |
| 105/LS1/BS3 | 0.421 | 85 | 3.5 | 1000 | | 170 | 95 |
| 105/LS2/BS1 | 0.421 | 92 | 3.5 | 1000 | | 150 | 95 |
| 105/LS2/BS2 | 0.421 | 85 | 3.5 | 1000 | | 150 | 95 |

Transversal stretching reduced the density of the films still further with again the density decrease being greater as the proportion of PET04 increased. This again surprisingly indicates that an increase in the isophthalic acid unit concentration in the aromatic polyester favoured increased void-forming in the film. The decrease in density is smaller than would be expect simply based on the measured thicknesses compared with the expected thicknesses for non-voided films.

At an IPA:TPA ratio of 0.0650 transversal stretching was surprisingly not possible above 113° C., but was possible at as low temperatures as 85° C., which is less than 10° C. above the glass transition temperature of the linear polyester matrix. This enables much higher optical densities to be realized by biaxial stretching.

Table 26 gives the measured thickness, the expected thickness, the measured optical density with the MacBeth TR924 densitometer in transmission mode with a visible filter, the expected optical density, i.e. the optical density calculated using the relationship disclosed in COMPARATIVE EXAMPLE 4 using the theoretical layer thickness values, and the difference between the observed optical density and the optical density expected due to a 2% by weight concentration of the particular titanium dioxide pigment used, ΔOD.

TABLE 26

| Invention example nr | IPA:TPA ratio | LS speed [m/min] | Thickness [μm] | Expected thickness [μm] | OD TR924 | Expected OD | ΔOD | ΔOD/ OD | OD [X-rite] |
|---|---|---|---|---|---|---|---|---|---|
| 88/LS1/BS1 | 0 | 4.0 | 101 | 87 | 1.00 | 0.35 | 0.65 | 0.65 | 0.78 |
| 89/LS1/BS1 | 0.0310 | 4.0 | 95 | 87 | 1.01 | 0.35 | 0.66 | 0.65 | 0.78 |
| 89/LS2/BS1 | 0.0310 | 4.0 | 102 | 91 | 0.99 | 0.37 | 0.62 | 0.63 | 0.75 |
| 90/LS1/BS1 | 0.0526 | 4.0 | 100 | 87 | 1.04 | 0.35 | 0.69 | 0.66 | 0.80 |
| 90/LS1/BS2 | 0.0526 | 4.0 | 97 | 87 | (1.04) | (0.35) | (0.69) | 0.66 | (0.80) |
| 91/LS1/BS1 | 0.0636 | 4.0 | 145 | 95 | 1.02 | 0.39 | 0.63 | 0.62 | 0.85 |
| 91/LS2/BS1 | 0.0636 | 4.0 | 150 | 95 | 1.11 | 0.39 | 0.72 | 0.65 | 0.90 |
| 91/LS3/BS1 | 0.0636 | 8.0 | 126 | 95 | 1.03 | 0.39 | 0.64 | 0.62 | 0.77 |
| 92/LS1/BS1 | 0.0637 | 4.0 | 140 | 95 | 1.20 | 0.39 | 0.81 | 0.67 | 0.97 |
| 92/LS1/BS2 | 0.0637 | 4.0 | 135 | 95 | 1.25 | 0.39 | 0.86 | 0.69 | 1.00 |
| 92/LS2/BS1 | 0.0637 | 4.0 | 116 | 95 | 1.10 | 0.39 | 0.71 | 0.64 | 0.86 |
| 93/LS1/BS1 | 0.0650 | 4.0 | 140 | 101 | 1.10 | 0.41 | 0.69 | 0.63 | 0.85 |
| 94/LS1/BS1 | 0.0650 | 4.0 | 110 | 88 | 1.06 | 0.36 | 0.70 | 0.66 | 0.84 |
| 94/LS2/BS1 | 0.0650 | 4.0 | 135 | 93 | 1.18 | 0.38 | 0.80 | 0.68 | 0.94 |
| 94/LS3/BS1 | 0.0650 | 4.0 | 150 | 97 | 1.11 | 0.40 | 0.71 | 0.64 | 0.88 |
| 95/LS1/BS1 | 0.0733 | 4.0 | 145 | 95 | 1.21 | 0.39 | 0.82 | 0.68 | 0.94 |
| 96/LS1/BS1 | 0.0748 | 4.0 | 138 | 95 | 1.20 | 0.39 | 0.81 | 0.67 | 0.97 |
| 97/LS1/BS1 | 0.0751 | 4.0 | 105 | 87 | 1.10 | 0.35 | 0.75 | 0.68 | 0.90 |
| 98/LS1/BS1 | 0.0761 | 4.0 | 147 | 95 | 1.20 | 0.39 | 0.81 | 0.67 | 0.97 |
| 98/LS2/BS1 | 0.0761 | 4.0 | 112 | 95 | 1.05 | 0.39 | 0.66 | 0.63 | 0.82 |
| 99/LS1/BS1 | 0.109 | 4.0 | 207 | 95 | 1.26 | 0.39 | 0.87 | 0.69 | 1.04 |
| 99/LS1/BS2 | 0.109 | 4.0 | 199 | 95 | 1.28 | 0.39 | 0.89 | 0.69 | 1.04 |
| 99/LS1/BS3 | 0.109 | 4.0 | 198 | 95 | 1.27 | 0.39 | 0.88 | 0.69 | 1.03 |
| 99/LS2/BS1 | 0.109 | 4.0 | 205 | 95 | 1.34 | 0.39 | 0.95 | 0.71 | 1.12 |
| 99/LS2/BS2 | 0.109 | 4.0 | 210 | 95 | 1.34 | 0.39 | 0.95 | 0.71 | 1.08 |
| 99/LS2/BS3 | 0.109 | 4.0 | 214 | 95 | 1.35 | 0.39 | 0.96 | 0.71 | 1.11 |
| 100/LS1/BS1 | 0.111 | 4.0 | 169 | 87 | 1.32 | 0.35 | 0.97 | 0.73 | 1.06 |
| 100/LS2/BS1 | 0.111 | 4.0 | 185 | 91 | 1.26 | 0.37 | 0.89 | 0.71 | 1.00 |
| | | | | 156 | | | | | |
| 101/LS1/BS1 | 0.111 | 4.0 | 130 | 86 | 1.24 | 0.35 | 0.89 | 0.72 | 1.00 |
| 101/LS2/BS1 | 0.111 | 4.0 | 125 | 86 | 0.95 | 0.35 | 0.60 | 0.63 | 0.74 |
| 101/LS3/BS1 | 0.111 | 4.0 | 120 | 86 | 0.98 | 0.35 | 0.63 | 0.64 | 0.74 |
| 102/LS1/BS1 | 0.168 | 4.0 | 198 | 95 | 1.30 | 0.39 | 0.91 | 0.70 | 1.05 |
| 102/LS1/BS2 | 0.168 | 4.0 | 201 | 95 | 1.28 | 0.39 | 0.89 | 0.69 | 1.04 |
| 102/LS1/BS3 | 0.168 | 4.0 | 204 | 95 | 1.30 | 0.39 | 0.91 | 0.70 | 1.08 |
| 103/LS1/BS1 | 0.239 | 4.0 | 191 | 95 | 1.20 | 0.39 | 0.81 | 0.67 | 0.99 |
| 103/LS1/BS2 | 0.239 | 4.0 | 186 | 95 | 1.19 | 0.39 | 0.80 | 0.67 | 0.97 |
| 104/LS1/BS1 | 0.320 | 4.0 | 211 | 95 | 1.26 | 0.39 | 0.87 | 0.69 | 1.00 |
| 104/LS1/BS2 | 0.320 | 4.0 | 210 | 95 | 1.30 | 0.39 | 0.91 | 0.70 | 1.08 |
| 104/LS2/BS1 | 0.320 | 4.0 | 190 | 95 | 1.19 | 0.39 | 0.80 | 0.67 | 0.95 |
| 104/LS2/BS2 | 0.320 | 4.0 | 200 | 95 | 1.21 | 0.39 | 0.82 | 0.68 | 0.98 |

TABLE 26-continued

| Invention example nr | IPA:TPA ratio | LS speed [m/min] | Thickness [μm] | Expected thickness [μm] | OD TR924 | Expected OD | ΔOD | ΔOD/ OD | OD [X-rite] |
|---|---|---|---|---|---|---|---|---|---|
| 105/LS1/BS1 | 0.421 | 4.0 | 190 | 95 | 1.14 | 0.39 | 0.75 | 0.66 | 0.91 |
| 105/LS1/BS2 | 0.421 | 4.0 | 170 | 95 | 1.14 | 0.39 | 0.75 | 0.66 | 0.90 |
| 105/LS1/BS3 | 0.421 | 4.0 | 170 | 95 | 1.16 | 0.39 | 0.77 | 0.66 | 0.91 |
| 105/LS2/BS1 | 0.421 | 4.0 | 150 | 95 | 1.03 | 0.39 | 0.64 | 0.62 | 0.81 |
| 105/LS2/BS2 | 0.421 | 4.0 | 150 | 95 | 1.07 | 0.39 | 0.68 | 0.63 | 0.83 |

The results of Table 26 show that at approximately the same stretching temperature the contribution to the optical density of biaxially stretched films of microvoiding increases to over 70% as the IPA:TPA ratio increases to 0.132. Above an IPA:TPA ratio of 0.132 there is a steady decrease to a still considerable contribution of 0.66 at an IPA:TPA ratio of 0.421, corresponding to 30 mole % isophthalate.

The presence of void-forming was demonstrated for several of the biaxially stretched films by clamping the films in an Instron 4411 apparatus and observing the changes in film thickness and optical density upon contacting the films with a soldering iron for 5 s at 150° C. The results of these experiments are given in Table 27.

TABLE 27

| Example nr. | OD (TR924) before heating | Thickness before heating [μm] | after heating at 150° C. for 5 s at pressure of 0.5 N/mm² OD (TR924) | after heating at 150° C. for 5 s at pressure of 0.5 N/mm² Thickness [μm] | % decrease in OD | Change in thickness at 150° C. [μm] |
|---|---|---|---|---|---|---|
| 88/LS1/BS1 | 1.03 | 103 | 0.62 | 94 | 40 | 9 |
| 90/LS1/BS2 | 1.05 | 97 | 0.58 | 87 | 45 | 10 |
| 97/LS1/BS1 | 1.14 | 106 | 0.53 | 84 | 53 | 22 |
| 100/LS1/BS1 | 1.34 | 168 | 0.83 | 110 | 38 | 58 |
| 100/LS2/BS1 | 1.25 | 156 | 0.65 | 112 | 48 | 44 |

Invention Examples 106 to 109

The ca. 1100 μm thick extrudates of INVENTION EXAMPLES 106 to 109 all with 2% by weight of titanium dioxide were produced as described for EXAMPLES 1 to 58 with 15% by weight of SAN and different weight ratios of TO4 and PET04 as summarized in Table 27.

TABLE 27

| Invention Example nr. | PET02 [% by wt] | PET04 [% by wt] | SAN 06 [% by wt] | UVITEX OB-one [ppm] | TiO₂ [% by wt] |
|---|---|---|---|---|---|
| 106 | 41.2 | 41.8 | 15 | 100 | 2.0 |
| 107 | 32.3 | 50.7 | 15 | 100 | 2.0 |
| 108 | 32 | 51 | 15 | 100 | 2.0 |
| 109 | — | 83 | 15 | 100 | 2.0 |

Stretching in the length direction was carried out for each extrudate as described in EXAMPLES 59 to 78 under the conditions given in Table 28. The expected thickness is the thickness based on the extrudate thickness and longitudinal as observed for non-voided films.

TABLE 28

| Invention Example nr. | Stretch ratio | Stretch force [N/mm²] | Stretch temperature [° C.] | Thickness [μm] | Expected thickness [μm] | OD TR924 | OD [X-rite] |
|---|---|---|---|---|---|---|---|
| 106/LS1* | 3.3 | 7.97 | | 375 | 333 | 1.08 | 0.96 |
| 106/LS2* | 3.3 | 7.14 | | | 333 | 0.948 | 0.86 |
| 106/LS3* | 3.3 | 9.67 | | | 333 | 1.19 | 1.09 |
| 107/LS1 | 3.8 | 8.3 | 120 | 300 | 290 | | 0.94 |
| 107/LS2 | 3.6 | 8.23 | 96 | 330 | 305 | | 0.96 |
| 107/LS3 | 3.3 | 8.6 | 90 | 365 | 333 | | |
| 107/LS4 | 3.1 | 8.2 | 80 | 380 | 355 | | |

TABLE 28-continued

| Invention Example nr. | Stretch ratio | Stretch force [N/mm²] | Stretch temperature [° C.] | Thickness [µm] | Expected thickness [µm] | OD TR924 | OD [X-rite] |
|---|---|---|---|---|---|---|---|
| 108/LS1 | 3.6 | 8.23 | 114 | 330 | | 1.26 | 0.96 |
| 109/LS1 | 3.85 | 8 | — | 320 | | 1.24 | 1.00 |

*stretching speed 4.0 m/min

Transversal stretching was then performed on the length-stretched films with a stretch time of 30 s and stretching speed of 1000%/min as described in EXAMPLES 1 to 58 under the conditions given in Table 29. The measured thickness, the expected thickness, i.e. thickness if no void-forming based on the extrudate thickness, the longitudinal stretch ratio and the transversal stretch ratio, the measured optical density with the MacBeth TR924 densitometer in transmission mode with a visible filter, the expected optical density, i.e. the optical density calculated using the relationship disclosed in COMPARATIVE EXAMPLE 5 using the theoretical layer thickness values, and the difference between the observed optical density and the optical density expected due to a 2% by weight concentration of the particular titanium dioxide pigment used, ΔOD, are also given in Table 29.

TABLE 29

| Invention Example nr. | Stretch ratio | Stretch temperature [° C.] | Density [g/mL] | Thickness [µm] | Expected thickness [µm] | OD TR924 | Expected OD | ΔOD |
|---|---|---|---|---|---|---|---|---|
| 106/LS1/BS1 | 3.5 | 115 | 1.19 | 140 | 95 | 0.925 | 0.39 | 0.535 |
| 106/LS1/BS2 | 3.5 | 100 | 1.08 | 116 | 95 | 1.05 | 0.39 | 0.66 |
| 106/LS2/BS1 | 3.5 | 100 | 1.17 | 123 | 95 | 1.01 | 0.39 | 0.62 |
| 107/LS1/BS1 | 3.3 | 114 | | 110 | 88 | 1.01 | 0.36 | 0.65 |
| 107/LS2/BS1 | 3.3 | 113 | | 135 | 93 | 1.17 | 0.38 | 0.69 |
| 107/LS3/BS1* | 3.5 | 111 | 1.132 | 140 | 95 | 1.20 | 0.39 | 0.81 |
| 107/LS4/BS1 | 3.3 | 110 | | 165 | 108 | 1.18 | 0.44 | 0.74 |
| 108/LS1/BS1 | 3.3 | 110 | | | 101 | 1.10 | | |
| 109/LS1/BS1 | 3.3 | 110 | 1.121 | | | 1.20 | 0.35 | 0.85 |

*stretching speed of 2000%/min

The elasticity (Young's) modulus and yield stress of the biaxially stretched extrudates were measured for INVENTION EXAMPLES 106/LS1/BS1, 106/LS1/BS2 and 106/LS2/BS1 and the results are summarized in Table 30 below:

TABLE 30

| | | Elasticity modulus [N/mm²] | | Yield stress [N/mm²] | |
|---|---|---|---|---|---|
| | | longitudinal direction | transversal direction | longitudinal direction | transversal direction |
| 106/LS1/BS1 | SP530103 | 2908 | 4470 | 65.7 | 121 |
| 106/LS1/BS2 | SP530104 | 2594 | 3742 | 56.3 | 103.4 |
| 106/LS2/BS1 | SP530201 | 2965 | 4410 | 62.2 | 125.9 |

The presence of void-forming was demonstrated for the biaxially stretched films of INVENTION EXAMPLES 108/LS1/BS1 and 109/LS1/BS1 by clamping the films in an Instron 4411 apparatus and observing the changes in film thickness and optical density upon contacting the film with a soldering iron for 5 s at various temperatures. The results of these experiments are given in Tables 31 and 32.

TABLE 31

| Invention Example nr | OD before heating | OD (TR924) after heating for 5 s at a pressure of 0.5 N/mm² at | | | | | ΔOD at 150° C. | % decrease in OD |
|---|---|---|---|---|---|---|---|---|
| | | 122° C. | 130° C. | 150° C. | 170° C. | 190° C. | | |
| 108/LS1/BS1 | 1.10 | 0.84 | 0.83 | 0.68 | 0.62 | 0.57 | 0.42 | 38 |
| 109/LS1/BS1 | 1.19 | 0.86 | 0.78 | 0.60 | 0.50 | — | 0.60 | 50 |

TABLE 32

| Invention Example nr | Film thickness before heating [μm] | Film thickness [μm] after heating for 5 s at a pressure of 0.5 N/mm² at | | | | |
|---|---|---|---|---|---|---|
| | | 122° C. | 130° C. | 150° C. | 170° C. | 190° C. |
| 108/LS1/BS1 | 125 | 117 | 117 | 113 | 106 | 84 |
| 109/LS1/BS1 | 100 | 94 | 88 | 81 | 73 | — |

Reductions in optical density at 150° C. of 0.19, 0.42 and 0.60 were observed for the films of INVENTION EXAMPLE 108/LS1/BS1 and 109/LS1/BS1 respectively corresponding to 38 and 50%.

Invention Examples 110 to 112

The ca. 1100 μm thick extrudates of INVENTION EXAMPLES 110 to 112 all with 2% by weight of titanium dioxide and 15% by weight of SAN 06 were produced as described for EXAMPLES 1 to 58 with different weight ratios of TO4 and PET04 as summarized in Table 33.

TABLE 33

| Invention Example nr. | PET02 [% by wt] | PET04 [% by wt] | SAN 06 [% by wt] | UVITEX OB-one [ppm] | TiO₂ [% by wt] |
|---|---|---|---|---|---|
| 110 | 32.3 | 50.7 | 15 | 100 | 2.0 |
| 111 | — | 83 | 15 | 100 | 2.0 |
| 112 | — | 83 | 15 | 100 | 2.0 |

Stretching in the length direction was carried out for each extrudate as described in EXAMPLES 59 to 78 under the conditions given in Table 34. The expected thickness is the thickness based on the extrudate thickness and longitudinal as observed for non-voided films.

TABLE 34

| Invention Example nr. | Stretch | | | Expected | | |
|---|---|---|---|---|---|---|
| | ratio | force [N/mm²] | temperature [° C.] | Thickness [μm] | thickness [μm] | OD TR924 | OD [X-rite] |
| 110/LS1 | 3.3 | 8.6 | 90 | 365 | 333 | | |
| 110/LS2 | 3.1 | 8.2 | 80 | 380 | 355 | | |
| 111/LS1 | 3.85 | 8 | — | 320 | | 1.24 | 1.00 |
| 112/LS1 | 3.62 | 8 | — | 323 | | 1.09 | 0.82 |

Transversal stretching was then performed on the length-stretched films with a stretch time of 30 s and stretching speed of 1000%/min as described in EXAMPLES 1 to 58 under the conditions given in Table 35. The measured thickness, the expected thickness, i.e. thickness if no void-forming based on the extrudate thickness, the longitudinal stretch ratio and the transversal stretch ratio, the measured optical density with the MacBeth TR924 densitometer in transmission mode with a visible filter, the expected optical density, i.e. the optical density calculated using the relationship disclosed in COMPARATIVE EXAMPLE 5 using the theoretical layer thickness values, and the difference between the observed optical density and the optical density expected due to a 2% by weight concentration of the particular titanium dioxide pigment used, ΔOD, are also given in Table 35.

TABLE 35

| Invention Example nr. | Stretch ratio | Stretch temperature [° C.] | Thickness [μm] | Expected thickness [μm] | OD TR924 | Expected OD | ΔOD |
|---|---|---|---|---|---|---|---|
| 110/LS1/BS1 | 3.3 | 153 | 140 | 101 | 1.10 | 0.41 | 0.69 |
| 110/LS2/BS1 | — | 150 | 162 | 108 | | 0.44 | |
| 111/LS1/BS1 | — | 160 | 101 | | 0.99 | | |
| 112/LS1/BS1 | — | 160 | 116 | | 0.98 | | |

The results of Table 35 show that at approximately the same stretching temperature the contribution to the optical density of biaxially stretched films clearly increases as the concentration of PET04 in the composition increases i.e. the concentration of isophthalic acid units in the polyester increases to the concentration of 10 mole % of the aromatic dicarboxylic acid in PET04 itself.

Invention Example 113

The 1100 μm thick extrudate of INVENTION EXAMPLE 113 having a composition of 2% by weight of titanium dioxide, 100 ppm of UVITEX OB-one [ppm], 15% by weight of SAN 06 and 83% by weight of PET04 was produced as described for EXAMPLES 1 to 58. Stretching in the length direction was carried out for the extrudate as described in EXAMPLES 1 to 58 under four different sets of conditions as given in Table 36. The expected thickness is the thickness based on the extrudate thickness and longitudinal as observed for non-voided films.

TABLE 36

| Invention Example nr. | Stretch | | | | Expected | | |
|---|---|---|---|---|---|---|---|
| | ratio | force [N/mm$^2$] | temperature [° C.] | Thickness [μm] | thickness [μm] | OD TR924 | OD [X-rite] |
| 113/LS1 | 3.8 | 8.3 | 120 | 300 | 290 | | 0.94 |
| 113/LS2 | 3.6 | 8.23 | 96 | 330 | 305 | | 0.96 |
| 113/LS3 | 3.3 | 8.6 | 90 | 365 | 333 | | |
| 113/LS4 | 3.1 | 8.2 | 80 | 380 | 355 | | |

Transversal stretching was then performed on the length-stretched films as described in EXAMPLES 59 to 78 under the conditions given in Table 37. The density, measured thickness and the expected thickness, i.e. thickness if no void-forming based on the extrudate thickness, the longitudinal stretch ratio and the transversal stretch ratio, are also given in Table 37.

TABLE 37

| Invention Example nr. | Transverse stretch | | | | | | Expected |
|---|---|---|---|---|---|---|---|
| | ratio | temperature [° C.] | time [s] | speed [%/min] | Density [g/mL] | Thickness [μm] | thickness [μm] |
| 113/LS3/BS1 | 3.3 | 86 | 30 | 1000 | 0.984 | 199 | 101 |
| 113/LS3/BS2 | 3.3 | 91 | 30 | 1000 | 0.978 | 185 | 101 |
| 113/LS3/BS3 | 3.3 | 98 | 30 | 1000 | 0.993 | 180, 190 | 101 |
| 113/LS3/BS4 | 3.3 | 100 | 30 | 1000 | 1.117 | 165 | 101 |
| 113/LS3/BS5 | 3.3 | 100 | 30 | 1000 | | 150 | 101 |
| 113/LS3/BS6 | | 101 | 30 | 1000 | | 105 | 101 |
| 113/LS3/BS7 | | 102 | 30 | 1000 | | 135 | 101 |
| 113/LS2/BS1 | 3.3 | 106 | 30 | 1000 | | 135 | 93 |
| 113/LS3/BS8 | 3.3 | 110 | 30 | 1000 | | 150 | 101 |
| 113/LS4/BS1 | 3.3 | 110 | 30 | 1000 | | 165 | 108 |
| 113/LS2/BS2 | 3.3 | 113 | 30 | 1000 | | 135 | 93 |
| 113/LS1/BS1 | 3.3 | 114 | 30 | 1000 | | 110 | 88 |
| 113/LS3/BS9 | 3.3 | 121 | 30 | 1000 | 1.199 | 150 | 101 |
| 113/LS2/BS3 | 3.3 | 123 | 30 | 1000 | | 120 | 93 |
| 113/LS3/BS10 | 3.3 | 128 | 30 | 1000 | 1.221 | 140 | 101 |
| 113/LS3/BS11 | 3.3 | 132 | 30 | 1000 | 1.228 | 140 | 101 |
| 113/LS3/BS12 | 3.3 | 142 | 30 | 1000 | 1.242 | 140 | 101 |
| 113/LS4/BS2 | | 150 | | | | 162 | 108 |
| 113/LS3/BS13 | 3.3 | 153 | 30 | 1000 | 1.235 | 140 | 101 |
| 113/LS3/BS14 | 3.5 | 111 | 30 | 2000 | 1.132 | 140 | 95 |
| 113/LS3/BS15 | | 110 | 10 | 1000 | | 152 | 101 |

Biaxial stretching reduced the density of the films with the density decrease being greater the lower the transversal stretching temperature. However, the decrease in density is smaller than would be expect simply based on the measured thicknesses compared with the expected thicknesses. This can be partly explained by the combination of two effects: the decrease in the density due to void forming on the one hand being to a degree compensated by the increase in the crystallinity of the polyester matrix due to biaxial stretching on the other.

Table 38 gives the measured thickness, the expected thickness, i.e. thickness if no void-forming, the optical density measured with a MacBeth TR924 densitometer in transmission mode with a visible filter, the expected optical density, i.e. the optical density calculated using the relationship disclosed in COMPARATIVE EXAMPLE 5 using the theoretical layer thickness values, and the difference between the observed optical density and the optical density expected due to a 2% by weight concentration of the particular titanium dioxide pigment used, ΔOD, together with the temperature at which the transversal stretching was carried out.

TABLE 38

| Invention Example nr. | Stretch temperature [° C.] | Thickness [μm] | Expected thickness [μm] | OD (TR924) | Expected OD | ΔOD | OD (X-rite) |
|---|---|---|---|---|---|---|---|
| 113/LS3/BS1 | 86 | 199 | 101 | 1.35 | 0.41 | 0.95 | 1.10 |
| 113/LS3/BS2 | 91 | 185 | 101 | 1.32 | 0.41 | 0.91 | 1.07 |
| 113/LS3/BS3 | 98 | 180, 190 | 101 | 1.28, 1.36 | 0.41 | 0.87, 0.95 | 1.03 |
| 113/LS3/BS4 | 100 | 165 | 101 | 1.20 | 0.41 | 0.79 | 0.96 |
| 113/LS3/BS5 | 100 | 150 | 101 | 1.22 | 0.41 | 0.81 | 1.00 |
| 113/LS3/BS6 | 101 | 105 | 101 | 1.15 | 0.41 | 0.75 | 0.90 |
| 113/LS3/BS7 | 102 | 135 | 101 | 1.08 | 0.41 | 0.67 | 0.81 |
| 113/LS2/BS1 | 106 | 135 | 93 | | 0.38 | | 0.1005 |
| 113/LS3/BS8 | 110 | 150 | 101 | | 0.41 | | 0.94 |
| 113/LS4/BS1 | 110 | 165 | 108 | 1.18 | 0.44 | 0.74 | 0.91 |
| 113/LS2/BS2 | 113 | 135 | 93 | 1.17 | 0.38 | 0.79 | 0.905 |
| 113/LS1/BS1 | 114 | 110 | 88 | 1.01 | 0.36 | 0.65 | 0.805 |
| 113/LS3/BS9 | 121 | 150 | 101 | 1.14 | 0.41 | 0.73 | 0.89 |
| 113/LS2/BS3 | 123 | 120 | 93 | | 0.38 | | 0.88 |
| 113/LS3/BS10 | 128 | 140 | 101 | 1.10 | 0.41 | 0.69 | 0.86 |
| 113/LS3/BS11 | 132 | 140 | 101 | 1.10 | 0.41 | 0.69 | 0.85 |
| 113/LS3/BS12 | 142 | 140 | 101 | 1.10 | 0.41 | 0.69 | 0.83 |
| 113/LS4/BS2 | 150 | 162 | 108 | | 0.44 | | 0.85 |
| 113/LS3/BS13 | 153 | 140 | 101 | 1.10 | 0.41 | 0.69 | 0.86 |

It is clear from the results in Table 38 that the degree of void-forming, as indicated by the optical density not attributable to the 2% by weight of titanium dioxide present, increased with decreasing transversal stretch temperature regardless of the other conditions pertaining during the transversal stretch process.

Table 39 summarizes the stretch conditions, the thickness, expected thickness, optical density, expected optical density and non-attributable increase in optical density as a result of void-forming for different films obtained at a stretch temperature of approximately 110° C.

TABLE 39

| Invention Example nr. | Transverse stretch | | | Thickness | | OD TR924 | Expected OD | ΔOD | OD (X-rite) |
|---|---|---|---|---|---|---|---|---|---|
| | temperature [° C.] | time [s] | speed [%/min] | Measured [μm] | Expected [μm] | | | | |
| 113/LS3/BS14 | 111 | 30 | 2000 | 140 | 95 | 1.20 | 0.39 | 0.81 | 0.95 |
| 113/LS3/BS8 | 110 | 30 | 1000 | 150 | 101 | | 0.41 | | 0.94 |
| 113/LS4/BS1 | 110 | 30 | 1000 | 165 | 108 | 1.18 | 0.44 | 0.74 | 0.91 |
| 113/LS3/BS15 | 110 | 10 | 1000 | 152 | 101 | 1.22 | 0.41 | 0.81 | 1.00 |

The data in Table 39 shows that reducing the stretching time from 30 s to 10 s and increasing the stretching speed from 1000%/min to 2000%/min also promote void-forming.

The presence of void-forming was demonstrated for the biaxially stretched film of INVENTION EXAMPLE 113/LS3/BS1 by clamping the film in an Instron 4411 apparatus and observing the changes in film thickness and optical density upon contacting the film with a soldering iron for 5 s at various temperatures. The results of these experiments are given in Tables 40 and 41.

TABLE 40

| Invention Example nr | OD before heating | OD (TR924) after heating for 5 s at a pressure of 0.5 N/mm² at | | | | | ΔOD at 150° C. | % decrease in OD |
|---|---|---|---|---|---|---|---|---|
| | | 122° C. | 130° C. | 150° C. | 170° C. | 190° C. | | |
| 113/LS1/BS1 | 1.36 | 1.18 | 1.12 | 1.02 | 0.82 | 0.72 | 0.42 | 25 |

TABLE 41

| Invention Example nr | Film thickness before heating [μm] | Film thickness [μm] after heating for 5 s at a pressure of 0.5 N/mm² at | | | | |
|---|---|---|---|---|---|---|
| | | 122° C. | 130° C. | 150° C. | 170° C. | 190° C. |
| 113/LS1/BS1 | 199 | 163 | 157 | 147 | 139 | 145 |

A reduction in optical density at 150° C. of 0.42 was observed for the film of INVENTION EXAMPLE 113/LS1/BS1 corresponding to 25% accompanied by a reduction of 26% in layer thickness.

Invention Examples 114 to 116

The ca. 1100 μm thick extrudates of INVENTION EXAMPLES 114 to 116 of unpigmented dispersions of SAN 06 in aromatic polyester were produced as described for EXAMPLES 1 to 58 with different concentrations of SAN 06, PET02 and PET04 as summarized in Table 42.

TABLE 42

| Invention Example nr. | PET02 [% by wt] | PET04 [% by wt] | SAN 06 [% by wt] | Magnesium acetate [ppm] | UVITEX OB-one [ppm] |
|---|---|---|---|---|---|
| 114 | 57.7 | 25.3 | 17 | — | 100 |
| 115 | 25.3 | 57.7 | 17 | — | 100 |
| 116 | — | 85.0 | 15 | 33 | — |

Stretching in the length direction was carried out for each extrudate as described in EXAMPLES 1 to 58 under the conditions given in Table 43. The expected thickness is the thickness based on the extrudate thickness and longitudinal as observed for non-voided films.

TABLE 43

| Invention example nr | Longitudinal stretch | | | Thickness | | OD TR924 | Expected OD | ΔOD | ΔOD/OD | OD [X-rite] |
|---|---|---|---|---|---|---|---|---|---|---|
| | ratio | force [N/mm²] | temperature [° C.] | Measured [μm] | Expected [μm] | | | | | |
| 114/LS1 | 3.8 | 8.21 | 175 | 301 | 289 | 0.80 | 0.05 | 0.75 | 0.94 | 0.47 |
| 114/LS2 | 3.6 | 8.65 | 142 | 320 | 305 | 0.72 | 0.05 | 0.67 | 0.93 | 0.47 |
| 115/LS1 | 3.8 | 8.44 | 116 | 298 | 289 | 0.97 | 0.05 | 0.92 | 0.95 | 0.77 |
| 115/LS2 | 3.6 | 8.65 | 97 | 330 | 305 | 1.06 | 0.05 | 1.01 | 0.95 | 0.85 |
| 115/LS3 | 3.35 | 6.36 | 119 | 320 | 328 | 0.78 | 0.05 | 0.73 | 0.93 | 0.60 |
| 116/LS1 | 3.3 | 8.0 | 89 | | | 1.00 | 0.05 | 0.95 | 0.95 | |
| 116/LS2 | 3.3 | 9.5 | 80 | | | 1.14 | 0.05 | 1.09 | 0.96 | |

Transversal stretching was then performed on the length-stretched films with a stretch time of 30 s and stretching speed of 1000%/min under the conditions given in Table 44. The measured thickness, i.e. thickness if no void-forming based on the extrudate thickness, the longitudinal stretch ratio and the transversal stretch ratio, the measured optical density with the MacBeth TR924 densitometer in transmission mode with a visible filter, the expected optical density, i.e. 0.05 the optical density of polyethylene terephthalate almost completely determined by refraction effects at the two sides of the film, and the difference between the observed optical density and the optical density expected due to the aromatic polyester, ΔOD, are also given in Table 44.

TABLE 44

| Invention | Transverse stretch | | Thickness | | OD | Expec- | ΔOD | ΔOD/ |
|---|---|---|---|---|---|---|---|---|
| | ratio | temperature [° C.] | Measured [μm] | Expected μm | | | | |
| 114/LS2/BS1 | 3.3 | 124 | 82 | 92 | 0.83 | 0.05 | 0.78 | 0.94 |
| 115/LS1/BS1 | 3.3 | 120 | 97 | 88 | 0.99 | 0.05 | 0.94 | 0.95 |
| 115/LS2/BS1 | 3.3 | 120 | 123 | 92 | 1.04 | 0.05 | 0.99 | 0.95 |
| 116/LS1/BS1 | 3.5 | 90 | 165 | 95 | 1.08 | 0.05 | 1.03 | 0.95 |

TABLE 44-continued

| Invention | Transverse stretch ratio | temperature [° C.] | Thickness Measured [μm] | Expected μm | OD | Expec- | ΔOD | ΔOD/ |
|---|---|---|---|---|---|---|---|---|
| 116/LS1/BS2 | 3.5 | 88 | 175 | 95 | 1.10 | 0.05 | 1.05 | 0.95 |
| 116/LS1/BS3 | 3.5 | 85 | 172 | 95 | 1.15 | 0.05 | 1.10 | 0.96 |
| 116/LS1/BS4 | 3.5 | 82 | 195 | 95 | 1.20 | 0.05 | 1.15 | 0.96 |
| 116/LS2/BS1 | 3.5 | 94 | 227 | 95 | 1.22 | 0.05 | 1.17 | 0.96 |
| 116/LS2/BS2 | 3.5 | 85 | 228 | 95 | 1.30 | 0.05 | 1.25 | 0.96 |
| 116/LS2/BS3 | 3.5 | 81 | 227 | 95 | 1.30 | 0.05 | 1.25 | 0.96 |
| 116/LS2/BS4 | 3.5 | 77 | 235 | 95 | 1.34 | 0.05 | 1.29 | 0.96 |
| 116/LS2/BS5 | 3.5 | 75 | 232 | 95 | 1.33 | 0.05 | 1.28 | 0.96 |

The results in Table 44 show strongly increased opacification optical densities of 1.28 and 1.29 due to void-forming for the films of INVENTION EXAMPLES 116/LS2/BS4 and 116/LS2/BS5 with a linear polyester matrix with 10 mole % isophthalate compared with an opacification optical density of 0.78 due to void forming for the film of INVENTION EXAMPLE 114/LS2/BS1 with a linear polyester matrix with 3 mole % isophthalate.

The presence of void-forming was demonstrated for the biaxially stretched films of EXAMPLES 114/LS2/BS1, 115/LS1/BS1 and 115/LS2/BS1 and the INVENTION EXAMPLE 116 series by clamping the films in an Instron 4411 apparatus and observing the changes in film thickness and optical density upon contacting the film with a soldering iron for 5 s at various temperatures. The results of these experiments are given in Tables 45 and 46.

TABLE 45

| Invention Example nr | OD before heating | OD (TR924) after heating for 5 s at a pressure of 0.5 N/mm² at | | | | | ΔOD at 170° C. | % decrease in OD |
|---|---|---|---|---|---|---|---|---|
| | | 122° C. | 130° C. | 150° C. | 170° C. | 190° C. | | |
| 114/LS2/BS1 | 0.83 | 0.45 | 0.38 | 0.19 | 0.16 | 0.18 | 0.67 | 81 |
| 115/LS1/BS1 | 0.99 | 0.49 | 0.42 | 0.22 | 0.14 | 0.13 | 0.85 | 86 |
| 115/LS2/BS1 | 1.04 | 0.67 | 0.44 | 0.22 | 0.16 | 0.13 | 0.88 | 85 |
| 116/LS1/BS1 | 1.10 | — | — | — | 0.23 | 0.17 | 0.87 | 79 |
| | 1.08 | | | | 0.17 | 0.14 | 0.91 | 84 |
| 116/LS1/BS2 | 1.11 | — | — | — | 0.18 | 0.17 | 0.93 | 84 |
| 116/LS1/BS3 | 1.12 | — | — | — | 0.25 | 0.19 | 0.87 | 78 |
| 116/LS1/BS4 | 1.10 | — | — | — | 0.23 | 0.22 | 0.87 | 79 |
| 116/LS2/BS1 | 1.29 | — | — | — | 0.30 | 0.19 | 0.99 | 77 |
| 116/LS2/BS2 | 1.32 | — | — | — | 0.32 | 0.16 | 1.00 | 76 |
| | 1.12 | | | | 0.17 | 0.20 | 0.92 | 82 |
| 116/LS2/BS3 | 1.33 | — | — | — | 0.32 | 0.22 | 1.01 | 76 |
| 116/LS2/BS4 | 1.32 | — | — | — | 0.48 | 0.16 | 0.84 | 64 |
| 116/LS2/BS5 | 1.32 | — | — | — | 0.35 | — | 0.97 | 72 |

TABLE 46

| Invention Example nr | Film thickness before heating [μm] | Film thickness [μm] after heating for 5 s at a pressure of 0.5 N/mm² at | | | | | Δ thickness at 170° C. | % decrease in thickness |
|---|---|---|---|---|---|---|---|---|
| | | 122° C. | 130° C. | 150° C. | 170° C. | 190° C. | | |
| 114/LS2/BS1 | 82 | 83 | 80 | 74 | 71 | 76 | 11 | 13 |
| 115/LS1/BS1 | 97 | 97 | 91 | 87 | 81 | 67 | 16 | 16 |
| 115/LS2/BS1 | 123 | 118 | 114 | 105 | 99 | 74 | 24 | 19 |
| 116/LS1/BS1 | 164 | — | — | — | 118 | 118 | 46 | 28 |
| | 163 | | | | 122 | 98 | 41 | 25 |
| 116/LS1/BS2 | 170 | — | — | — | 121 | 91 | 49 | 29 |
| 116/LS1/BS3 | 158 | — | — | — | 119 | 101 | 39 | 25 |
| 116/LS1/BS4 | 194 | — | — | — | 140 | 140 | 54 | 28 |
| 116/LS2/BS1 | 209 | — | — | — | 142 | 135 | 67 | 32 |
| 116/LS2/BS2 | 220 | — | — | — | 141 | 104 | 79 | 36 |
| 116/LS2/BS3 | 216 | — | — | — | 138 | 111 | 78 | 36 |
| 116/LS2/BS4 | 219 | — | — | — | 148 | 92 | 71 | 32 |
| 116/LS2/BS5 | 216 | — | — | — | 139 | — | 77 | 36 |

A reduction in optical density at 190° C. of 0.67, 0.85 and 0.88 was observed for the films of INVENTION EXAMPLES 114/LS2/BS1, 115/LS1/BS1 and 115/LS2/BS1 respectively corresponding to 81, 86 and 85%. In the INVENTION 116 series the reduction in optical density at 190° C. varied between 0.84 and 1.01 corresponding to 64 to 84%.

These reductions in optical density were accompanied by a reduction of 13, 16 and 19% in layer thickness with 25 to 36% reduction in thickness being observed for the INVENTION EXAMPLE 116 series. These results show an extremely large reduction in optical density of up to 1.01 upon transparentizing polyester layers with 15 or 17 wt % SAN 06.

Comparative Example 6

The ca. 1100 μm thick extrudate of COMPARATIVE EXAMPLE 6 (SP54) with 2% by weight of titanium dioxide, 15% by weight of TPX® DX820, poly(4-methylpentene), 33.3% by weight of PET02 and 49.7% by weight of PET04 having an IPA:TPA molar ratio of 0.0636 was produced as described for EXAMPLES 1 to 58. Stretching in the length direction was carried out for each extrudate as described in EXAMPLES 1 to 58 under the conditions given in Table 47. The expected thickness is the thickness based on the extrudate thickness and longitudinal as observed for non-voided films.

TABLE 47

| Comparative example nr. | Longitudinal stretch | | | Density [g/mL] | Thickness | | OD TR924 | Expected OD | ΔOD | ΔOD/ OD | [X-rite] |
|---|---|---|---|---|---|---|---|---|---|---|---|
| | Ratio | Force [N/mm²] | Temperature [° C.] | | Measured [μm] | Expected [μm] | | | | | |
| 6/BS1* | 3.3 | 5.21 | | 1.147 | 500 | 333 | 1.10 | 0.87 | 0.23 | 0.21 | 0.96 |

*stretch speed = 4.0 m/min

Transversal stretching was then performed on the length-stretched film with a stretch time of 30 s and stretching speed of 1000%/min under the conditions given in Table 48. The measured thickness, the expected thickness, i.e. thickness if no void-forming based on the extrudate thickness, the longitudinal stretch ratio and the transversal stretch ratio, the measured optical density with the MacBeth TR924 densitometer in transmission mode with a visible filter, the expected optical density and the difference between the observed optical density and the optical density expected due to the aromatic polyester, ΔOD, are also given in Table 48.

TABLE 48

| Comparative example nr. | Transversal stretch | | Density [g/mL] | Thickness | | OD TR924 | Expected OD | ΔOD | ΔOD/ OD |
|---|---|---|---|---|---|---|---|---|---|
| | ratio | temperature [° C.] | | Measured [μm] | Expected [μm] | | | | |
| 6/LS1/BS1 | 3.5 | 100 | 0.64 | 270 | 95 | 1.08 | 0.39 | 0.69 | 0.64 |

The results in Table 48 clearly show very substantial opacification, 64% of the optical density realized being due to void-forming with a matrix of PET04 with TPX as crystalline dispersed phase with a particle size of ca. 10 μm. However, the elasticity (Young's) modulus in the longitudinal direction at 1258 N/mm² and the yield stress in the longitudinal direction at 26.4 N/mm² were substantially lower than for materials using SAN as opacity-producing agent, see results for INVENTION EXAMPLES 106/LS1/BS1, 106/LS1/BS2 and 106/LS2/BS1.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A process for preparing a white non-transparent microvoided biaxially stretched film comprising the steps of:
   i) mixing at least one linear polyester having monomer components consisting essentially of at least one aromatic dicarboxylic acid, at least one aliphatic diol and optionally at least one aliphatic dicarboxylic acid, a non-crosslinked random styrene acrylonitrile polymer (SAN-polymer) and at least one ingredient selected from the group consisting of inorganic opacifying pigments, whitening agents, colorants, UV-absorbers, light stabilizers, antioxidants and flame retardants in a kneader or an extruder to produce a mixture comprising said non-crosslinked random SAN-polymer in a linear polyester matrix,
   ii) forming the mixture produced in step i) into a film with a thickness between 10 to 6000 μm followed by quenching;
   iii) stretching said film at a stretching tension between 4.0 to 8.0 N/mm$^2$ at a temperature between 80 and 90° C.; and
   iv) subjecting the film obtained in (iii) to a further stretching process at an angle substantially 90° to the first stretching process to at least twice its initial length at a stretching tension between 4.0 to 8.0 N/mm$^2$ and a temperature between 80 and 90° C.;
   wherein the weight ratio of said linear polyester matrix to said non-crosslinked random SAN-polymer is in the range of 2.0:1 to 9.0:1 and wherein the monomer component of one of said at least one aromatic dicarboxylic acid is isophthalate and said isophthalate is present in said linear polyester matrix in a concentration of 15 mole % or less of all dicarboxylic acid monomer units in said linear polyester matrix.

2. The process according to claim 1, wherein the inorganic opacifying pigment is present in a concentration of ≦10% by weight.

3. The process according to claim 1, wherein said isophthalate is present in said polyester matrix in a concentration of 12 mole % or less of all dicarboxylic acid monomer units in said linear polyester matrix.

4. The process according to claim 1, wherein said linear polyester does not have butylene terephthalate as the main component.

5. The process according to claim 1, wherein said linear polyester has an inherent viscosity determined in a 0.5 g/dL solution of 60 wt % phenol and 40 wt % ortho-dichlorobenzene at 25° C. of at least 0.45 dl/g.

6. The process according to claim 1, wherein the concentration of acrylonitrile monomer (AN-monomer) units in said SAN-polymer is 15 to 35% by weight.

7. The process according to claim 1, wherein said weight ratio of said linear polyester to said non-crosslinked SAN-polymer is in the range 2.7:1 to 5.5:1.

8. The process according to claim 1, wherein the concentration of the inorganic opacifying pigment is ≧0.1% by weight.

9. The process according to claim 1, wherein said inorganic opacifying pigment is selected from the group consisting of silica, zinc oxide, zinc sulphide, lithopone, barium sulphate, calcium carbonate, titanium dioxide, aluminum phosphate and clays.

10. The process according to claim 1, wherein said whitening agent is selected from the group consisting of bis-benzoxazoles, benzotriazole-phenylcoumarins, naphthotriazole-phenylcoumarins, triazine-phenylcoumarins, and bis(styryl)biphenyls.

11. The process according to claim 10, wherein said bis-benzoxazole is selected from the group consisting of bis-benzoxazolyl-stilbenes and bis-benzoxazolyl-thiophenes.

* * * * *